(12) United States Patent
Anderson et al.

(10) Patent No.: US 7,660,499 B2
(45) Date of Patent: Feb. 9, 2010

(54) OPTICAL SPOT DISPLACEMENT APPARATUS

(75) Inventors: Betty Lise Anderson, Gahanna, OH (US); Victor Argueta-Diaz, Columbus, OH (US)

(73) Assignee: The Ohio State University, Columbus, OH (US)

( * ) Notice: Subject to any disclaimer, the term of this patent is extended or adjusted under 35 U.S.C. 154(b) by 248 days.

(21) Appl. No.: 11/182,111

(22) Filed: Jul. 15, 2005

(65) Prior Publication Data

US 2006/0044987 A1   Mar. 2, 2006

Related U.S. Application Data

(60) Provisional application No. 60/588,732, filed on Jul. 16, 2004.

(51) Int. Cl.
G02B 6/34 (2006.01)
(52) U.S. Cl. ............................. 385/37; 385/15; 385/31
(58) Field of Classification Search ................... 385/15, 385/31, 37
See application file for complete search history.

(56) References Cited

U.S. PATENT DOCUMENTS

| | | | |
|---|---|---|---|
| 3,428,391 A | 2/1969 | Newcomer | |
| 3,463,571 A | 8/1969 | Boehm et al. | |
| 3,755,676 A | 8/1973 | Kinsel | |
| 3,892,468 A | 7/1975 | Duguay | |
| 4,225,938 A | 9/1980 | Turpin | |
| 4,344,671 A | 8/1982 | Lang | |
| 4,474,434 A | 10/1984 | Carlsen et al. | |
| 4,474,435 A | 10/1984 | Carlsen et al. | |
| 4,546,249 A | 10/1985 | Whitehouse et al. | |
| 4,929,956 A | 5/1990 | Lee et al. | |
| 5,018,816 A | 5/1991 | Murray et al. | |
| 5,018,835 A | 5/1991 | Dorschner | |
| 5,117,239 A | 5/1992 | Riza | |
| 5,231,405 A | 7/1993 | Riza | |
| 5,274,385 A | 12/1993 | Riza | |
| 5,276,758 A | 1/1994 | Hughes | |
| 5,319,477 A | 6/1994 | DeJule | |
| 5,329,118 A | 7/1994 | Riza | |

(Continued)

FOREIGN PATENT DOCUMENTS

JP    10333089 A2    12/1998

(Continued)

OTHER PUBLICATIONS

U.S. Appl. No. 09/645,136, Non-final Office Action, mailed Aug. 15, 2001.

(Continued)

*Primary Examiner*—Jennifer Doan
(74) *Attorney, Agent, or Firm*—Calfee, Halter & Griswold LLP

(57) ABSTRACT

Optical spot displacement apparatus comprises a face that is divided into a plurality of columns; each column of the plurality including a predetermined number of prisms, the predetermined number of prisms of a same column configured within the corresponding column to displace at least one incident light beam a common predetermined distance from incidence, and the predetermined number of prisms of different columns configured within each corresponding column to displace the at least one incident light beam a different predetermined distance from incidence.

40 Claims, 16 Drawing Sheets

U.S. PATENT DOCUMENTS

| | | |
|---|---|---|
| 5,418,880 A | 5/1995 | Lewis et al. |
| 5,463,497 A | 10/1995 | Muraki et al. |
| 5,465,175 A | 11/1995 | Woodgate et al. |
| 5,475,525 A | 12/1995 | Tournois et al. |
| 5,512,907 A | 4/1996 | Riza |
| 5,592,333 A | 1/1997 | Lewis |
| 5,623,360 A | 4/1997 | Gesell et al. |
| 5,724,163 A | 3/1998 | David |
| 5,726,752 A | 3/1998 | Uno et al. |
| 5,767,956 A | 6/1998 | Yoshida |
| 5,852,693 A | 12/1998 | Jeong |
| 5,859,967 A | 1/1999 | Kaufeld et al. |
| 5,936,759 A | 8/1999 | Buttner |
| 5,973,727 A | 10/1999 | McGrew et al. |
| 6,014,244 A | 1/2000 | Chang |
| 6,040,880 A | 3/2000 | Tsuboi |
| 6,064,506 A | 5/2000 | Koops |
| 6,181,367 B1 | 1/2001 | McGrew et al. |
| 6,188,817 B1 | 2/2001 | Goodfellow |
| 6,236,506 B1 | 5/2001 | Cao |
| 6,266,176 B1 * | 7/2001 | Anderson et al. ........... 359/245 |
| 6,323,981 B1 | 11/2001 | Jensen |
| 6,388,815 B1 | 5/2002 | Collins, Jr. et al. |
| 6,429,976 B1 | 8/2002 | Yamamoto et al. |
| 6,480,323 B1 | 11/2002 | Messner et al. |
| 6,522,404 B2 | 2/2003 | Mikes et al. |
| 6,525,889 B1 | 2/2003 | Collins, Jr. et al. |
| 6,535,340 B1 | 3/2003 | Saruwatari |
| 6,637,899 B2 | 10/2003 | Sunaga et al. |
| 6,647,164 B1 | 11/2003 | Weaver et al. |
| 6,674,939 B1 | 1/2004 | Anderson et al. |
| 6,711,316 B2 | 3/2004 | Ducellier |
| 6,724,535 B1 | 4/2004 | Clabburn |
| 6,724,951 B1 | 4/2004 | Anderson et al. |
| 6,734,955 B2 | 5/2004 | Wight et al. |
| 6,760,140 B1 | 7/2004 | Argueta-Diaz et al. |
| 6,816,307 B1 | 11/2004 | Sun |
| 6,922,277 B2 | 7/2005 | Moon et al. |
| 6,934,069 B2 | 8/2005 | Moon et al. |
| 6,952,306 B1 | 10/2005 | Anderson |
| 6,958,861 B1 | 10/2005 | Argueta-Diaz |
| 7,171,068 B2 | 1/2007 | Bartlett et al. |
| 7,215,474 B2 | 5/2007 | Argueta-Diaz |
| 7,236,238 B1 | 6/2007 | Durresi et al. |
| 2002/0030814 A1 | 3/2002 | Mikes et al. |
| 2003/0202731 A1 | 10/2003 | Ionov et al. |
| 2004/0190823 A1 | 9/2004 | Leuthold et al. |
| 2005/0007668 A1 | 1/2005 | Serati et al. |
| 2006/0034567 A1 | 2/2006 | Anderson et al. |
| 2006/0061893 A1 | 3/2006 | Anderson et al. |
| 2006/0062517 A1 | 3/2006 | Anderson et al. |
| 2006/0114568 A1 | 6/2006 | Argueta-Diaz |

FOREIGN PATENT DOCUMENTS

| | | |
|---|---|---|
| WO | WO 01/14924 A1 | 3/2001 |
| WO | WO 02/29436 A1 | 4/2002 |
| WO | WO 03/075048 A2 | 9/2003 |
| WO | WO 03/083521 A2 | 10/2003 |
| WO | WO 03/083541 A2 | 10/2003 |

OTHER PUBLICATIONS

U.S. Appl. No. 09/645,136, Notice of Allowance and Fee(s) Due and Notice of Allowability with Examiner's Statement of Reasons for Allowance, mailed Feb. 26, 2002.

U.S. Appl. No. 09/688,478, Non-final Office Action, mailed Jan. 20, 2002.

U.S. Appl. No. 09/688,478, Notice of Allowance and Fee(s) Due and Notice of Allowability with Examiner's Statement of Reasons for Allowance, mailed Jul. 2, 2002.

U.S. Appl. No. 09/688,904, Notice of Allowance and Issue Fee Due and Notice of Allowability with Examiner's Amendment and Examiner's Statement of Reasons for Allowance, mailed Jan. 1, 2001.

U.S. Appl. No. 10/086,355, Non-final Office Action, mailed Feb. 2, 2003.

U.S. Appl. No. 10/086,355, Non-final Office Action, mailed Aug. 13, 2003.

U.S. Appl. No. 10/086,355, Notice of Allowance and Fee(s) Due and Notice of Allowability with Examiner's Amendment, Examiner's Statement of Reasons for Allowance, and Interview Summary, mailed Feb. 18, 2004.

Int'l App. No. PCT/US03/06189, International Search Report, mailed Oct. 20, 2003.

U.S. Appl. No. 10/106,177, Notice of Allowance and Fee(s) Due and Notice of Allowability with Examiner's Statement of Reasons for Allowance, mailed Jun. 12, 2003.

Int'l App. No. PCT/US03/09246, International Search Report, mailed Sep. 4, 2003.

Int'l App. No. PCT/US03/09246, International Preliminary Examination Report, completed Dec. 11, 2003.

U.S. Appl. No. 10/106,776, Non-final Office Action, mailed Jun. 10, 2003.

U.S. Appl. No. 10/106,776, Final Office Action, mailed Nov. 21, 2003.

U.S. Appl. No. 10/106,776, Notice of Allowance and Fee(s) Due and Notice of Allowability, mailed Dec. 11, 2003.

Int'l App. No. PCT/US03/09242, International Search Report, mailed Sep. 23, 2003.

Int'l App. No. PCT/US03/09242, International Preliminary Examination Report, completed Sep. 8, 2004.

U.S. Appl. No. 10/726,770, Non-final Office Action, mailed Aug. 20, 2004.

U.S. Appl. No. 10/726,770, Notice of Allowance and Fee(s) Due and Notice of Allowability with Examiner's Amendment, Examiner's Statement of Reasons for Allowance, and Interview Summary, mailed May 5, 2005.

U.S. Appl. No. 10/726,771, Non-final Office Action, mailed Jan. 1, 2005.

U.S. Appl. No. 10/726,771, Final Office Action, mailed Oct. 6, 2005.

U.S. Appl. No. 10/726,771, Non-final Office Action, mailed Jan. 30, 2006.

U.S. Appl. No. 10/726,771, Notice of Allowance and Fee(s) Due and Notice of Allowability with Examiner's Statement of Reasons for Allowance and Interview Summary, mailed Sep. 12, 2006.

U.S. Appl. No. 10/726,771, Notice of Allowance and Fee(s) Due and Notice of Allowability with Examiner's Statement of Reasons for Allowance, mailed Feb. 28, 2007.

U.S. Appl. No. 10/727,009, Notice of Allowance and Fee(s) Due and Notice of Allowability with Examiner's Statement of Reasons for Allowance, mailed Dec. 7, 2004.

U.S. Appl. No. 10/727,009, Notice of Allowance and Fee(s) Due and Notice of Allowability with Examiner's Statement of Reasons for Allowance, mailed May 24, 2005.

U.S. Appl. No. 11/184,535, Non-final Office Action, mailed Oct. 10, 2006.

U.S. Appl. No. 11/184,535, Non-final Office Action, mailed Apr. 3, 2007.

U.S. Appl. No. 11/183,029, Non-final Office Action, mailed Nov. 20, 2006.

U.S. Appl. No. 11/256,578, Non-final Office Action, mailed Mar. 29, 2006.

U.S. Appl. No. 10/256,578, Notice of Allowance and Fee(s) Due and Notice of Allowability with Examiner's Statement of Reasons for Allowance, mailed Aug. 17, 2006.

U.S. Appl. No. 10/256,578, Notice of Allowance and Fee(s) Due and Notice of Allowability with Examiner's Statement of Reasons for Allowance, mailed Dec. 6, 2006.

Collins et al., An Experimental Numerical Optical Processor (NOP), Digest of Papers for Compcon 78, IEEE catalog No. 78CH1328-4C, San Francisco, CA, Feb. 28-Mar. 3, 1978, pp. 198-199.

Collins, Jr., The Design of Devices for Producing Optically Controlled Incremental Time Delays for Phased Array Radars, National Reconnaissance Office, Contract No. NRO-98-C-6002, Technical Report 736076-1, The Ohio State University, Oct. 1998, 60 pages.

Collins, Jr. et al., True Time Delay with Binary Time Delay for Large Arrays, 1998 Antenna Applications Symposium, Allerton Park, Monticello, IL, Sep. 1998, 13 pages.

Dolphi et al., Experimental Demonstration of a Phased-Array Antenna Optically Controlled with Phase and Time Delays, Applied Optics, vol. 35, No. 26, Sep. 10, 1006, pp. 5293-5300.

Int'l App. No. PCT/US00/23361, International Search Report, mailed Jan. 8, 2001.

Int'l App. No. PCT/US00/23361, International Preliminary Examination Report, completed May 8, 2001.

EP App. No. 00 96 1366, Supplementary European Search Report, completed Apr. 3, 2003.

U.S. Appl. No. 10/726,771, Durresi et al.

Anderson, et al., Increasing Efficiency of Optical Beam Steerers, Draft Technical Report #3 for Harris Corporation, The Ohio State University, May 30, 2003, pp. 1-11.

Anderson et al., Binary-Counting True Time Delay Generator Using a White Cell Design and Deformable Mirror Devices, LEOS, Orlando, FL, Dec. 1998, 2 pgs.

Anderson et al., Design Advances in Free-Space Optical True-Time Delay Device, PSAA-8, Monterey, CA, Jan. 1998, 3 pgs.

Anderson et al., Highly Parallel Optical Device to Produce True Time Delays for Phased Array Antennas, Allerton, Sep. 1998, 14 pgs.

Anderson et al., Optically Produced True-Time Delays for Phased Antenna Arrays, Applied Optics, vol. 36, No. 32, Nov. 20, 1997, pp. 8493-8503.

Anderson et al., Optical Cross-Connect Based on Tip/Tilt Micromirrors in a White Cell, IEEE Journal of Selected Topics in Quantum Electronics, vol. 9, No. 2, Mar./Apr. 2003, pp. 579-593.

Anderson, et al. Optical Interconnection Device Based on the White Cell, presentation at Notre Dame University Nov. 6, 2002, 46 pgs.

Anderson, Optical Interconnections, Optical True-Time Delays, and More.., presentation at University of Colorado Jan. 28, 2003, 61 pgs.

Anderson et al., Steering of Optical Beams Using True-Time Delay Based on the White Cell, Optical Society of America, 2005, 4 pgs.

Anderson, et al., Polynomial-based optical true-time delay devices with microelectromechanical mirror arrays, Applied Optics, vol. 41, No. 26, Sep. 10, 2002, pp. 5449-5461.

Argueta-Diaz et al., Binary Optical Interconnection: Patent Disclosure Addendum, Mar. 7, 2005, pp. 1-47.

Argueta-Diaz, et al. Reconfigurable Photonic Switch Based on a Binary System Using the White Cell and Micromirror Arrays, IEEE Journal of Selected Topics in Quantum Electronics, vol. 9, No. 2, Mar./Apr. 2003, pp. 594-602.

Chen et al., 1-to-12 Surface Normal Three-Dimensional Optical Interconnects, Applied Physics Letters 63(14), Oct. 4, 1993, pp. 1883-1885.

Cohen et al., Optically Controlled Serially Fed Phased Array Sensor, IEEE Photonics Technology Letters, vol. 8, No. 12, Dec. 1996, pp. 1683-1685.

Collins et al., Numerical Optical Data Processing, Proceedings of the 1978 International Optical Computing Conference, London, England, Sep. 1978, pp. 194-197.

Collins et al., Optics for Numerical Calculations, Proceedings of ICO-11 Conference, Madrid, Spain, 1978, pp. 311-314.

Collins, Jr. et al., Optical True Time Delay for Phased Array Antennas Based on the White Cell, GOMAC, Monterey, CA, Mar. 1999, 4 pgs.

Collins, Numerical Optical Data Processor, SPIE, vol. 128, Effective Utilization of Optics in Radar Systems, 1977, pp. 313-319.

Ewing et al., Advancements in LCoS Optical Phased Array Technology, BNS Boulder Nonlinear Systems (undated), pp. 1-23.

Fairley et al., The Microphotonics Revolution, Mit's Magazine of Innovation, Technology Review, Jul./Aug. 2000, pp. 38-44.

Freitag et al., A Coherent Optically Controlled Phased Array Antenna System, IEEE Microwave and Guided Wave Letters, vol. 3, No. 9, Sep. 1993, pp. 293-295.

Goutzoulis et al., Hybrid Electronic Fiber Optic Wavelength-Multiplexed System for True Time-Delay Steering of Phased Array Antennas, Optical Engineering, vol. 31, No. 11, Nov. 1992, pp. 2312-2322.

Higgins et al., Design and demonstration of a switching engine for a binary true-time-delay device that uses a White cell, Applied Optics, vol. 42, No. 23, Aug. 10, 2003, pp. 4747-4757.

Kunathikom, et al. Design of Delay Elements in Binary Optical True-Time Delay Device that uses a White Cell, Applied Optics, vol. 42, No. 35, Dec. 10, 2003, pp. 6984-6994.

Li et al., Angular Limitations of Polymer-Based Waveguide Holograms for 1-to-many V-shaped Surface-Normal Optical Interconnects, Applied Physics Letters 65(9), Aug. 29, 1994, pp. 1070-1072.

Liu et al., Cascaded Energy-Optimized Linear Volume Hologram Array for 1-to-many Surface-Normal Even Fan-Outs, Optics and Laser Technology, vol. 29, No. 6, 1997, pp. 321-325.

Rader, et al., Demonstration of a Linear Optical True-time Delay Device by Use of a Microelectromechanical Mirror Array, Applied Optics, vol. 42, No. 8, Mar. 10, 2003, pp. 1409-1416.

Saleh et al., Fundamentals of Photonics, Wiley, Aug. 1991.

White, Long Optical Paths of Large Aperture, Journal Optical Society America, vol. 32, May 1942, pp. 285-288.

White, Very Long Optical Paths in Air, Journal Optical Society America, vol. 66, No. 5, May 1976, pp. 411-416.

Yen et al., Operation of a Numerical Optical Data Processor, 1980, SPIE vol. 232, International Optical Computing Conference, 1980, pp. 160-167.

U.S. Appl. No. 11/184,535, Notice of Allowance and Fee(s) Due and Notice of Allowability with Examiner's Statement of Reasons for Allowance, mailed Jan. 31, 2008, 6 pages.

U.S. Appl. No. 11/184,536, Non-final Office Action, mailed May 1, 2008, 9 pages.

U.S. Appl. No. 11/801,105, Non-final Office Action, mailed Apr. 29, 2008, 9 pages.

U.S. Appl. No. 11/184,535, Final Office Action, 14 pages, mailed Oct. 15, 2007.

Final Office action from U.S. Appl. No. 11/184,536 dated Dec. 8, 2008.

Response to Office action from U.S. Appl. No. 11/184,536 dated Aug. 1, 2008.

Office action from U.S. Appl. No. 11/801,105 dated Nov. 3, 2008.

Response to Office action from U.S. Appl. No. 11/801,105 dated Jul. 16, 2008.

Chiou et al., A Mirror Device with Tilt and Piston Motions, Oct. 1999, SPIE, vol. 3893, pp. 298-303.

Bishop et al., The Rise of Optical Switching, Scientific American, Jan. 2001, pp. 88-94.

Hect, Many Approaches Taken for All-Optical Switching, Laser Focus World, www.optoelectronics-world.com, Aug. 2001, 5 pgs.

Webb et al., Stroke Amplifier for Deformable Mirrors, Applied Optics, vol. 43, No. 28, Oct. 1, 2004, pp. 5330-5333.

Zdeblick, Design Variables Prevent a Single Industry Standard, Laser Focus World, www.optoelectronics-world.com, Mar. 2001, 4 pgs.

* cited by examiner

OPTICAL SPOT DISPLACEMENT APPARATUS

This utility application claims the benefit of the filing date of the U.S. Provisional Application 60/588,732, entitled "Spot Displacement Device For White Cell-Based Binary Optical Interconnection Device", and filed Jul. 16, 2004.

BACKGROUND OF THE INVENTION

The present invention relates to optical devices, in general, and more particularly, to optical spot displacement apparatus.

Generally, an optical interconnection or cross-connection device, like a White cell optical switch, for example, comprises a plurality of optical elements disposed in a predetermined spatial three dimensional pattern for directing one or more light beams from an input through a plurality of reflections to an output. Multiple light beams may bounce through various stages of the device simultaneously. Typically, the interconnection device allows a set of $N_{in}$ optical inputs to be switched among $N_{out}$ outputs in a free-space approach, in which light beams bounce multiple times in a White cell. On each bounce a given beam can be switched between different paths, and thus transferred to different outputs.

In some applications, an optical stage is included in the interconnection device to shift the position of a light beam in a particular plane which displaces the illuminating spot image thereof. Thus, this spot displacement stage may be used in the optical interconnection device to shift spot images of the light beams to different outputs. The number of outputs that can be reached is controlled by the switching mechanism of the White Cell and the particular spot shifting stage. In a binary design, the number of outputs is proportional to $2^m$, where m is the number of bounces.

The optical elements of current spot displacement stages are not without improvement. The present invention provides for optical spot displacement apparatus that is easily modified to produce small as well as large spot displacements, rendering an improved scaling of the displacement, which will be better understood from the description found herein below.

SUMMARY OF THE INVENTION

In accordance with one aspect of the present invention, optical spot displacement apparatus comprises: a face that is divided into a plurality of columns; each column of the plurality including a predetermined number of prisms, the predetermined number of prisms of a same column configured within the corresponding column to displace at least one incident light beam a common predetermined distance from incidence, and the predetermined number of prisms of different columns configured within each corresponding column to displace the at least one incident light beam a different predetermined distance from incidence.

In accordance with another aspect of the present invention, optical spot displacement apparatus comprises: a first plane and a second plane; a mirror disposed at the first plane, the mirror including an entrance region and an exit region; a series of spherical mirrors disposed along a path at the second plane; wherein at least one light beam incident the entrance region will enter and travel along the path by reflections between the spherical mirrors of the second plane and mirror of the first plane until the at least one light beam reaches the exit region where it exits rendering the at least one light beam displaced by a predetermined distance commensurate with a distance between the entrance and exit regions of said mirror.

In accordance with yet another aspect of the present embodiment, optical waveguide based spot displacement apparatus comprises: a substrate of a first refractive index; a core channel of a second refractive index disposed within the substrate, the second refractive index being greater than the first refractive index, the core channel including an entrance region and an exit region spaced apart a predetermined distance; a first optical element disposed at the entrance region for coupling at least one incident light beam into the core channel at a first predetermined angle to cause said at least one incident light beam to travel through the core channel; and a second optical element disposed at the exit region for coupling the at least one traveling light beam from the core channel at a second predetermined angle to cause the at least one traveling light beam to exit from the core channel.

BRIEF DESCRIPTION OF THE DRAWINGS

FIG. 4a is a connectivity diagram of the light beam flow in a dual White cell configuration.

FIGS. 12a and 12b are isometric perspective views of other alternate prism embodiments of a spot displacement device.

DETAILED DESCRIPTION OF THE INVENTION

An optical switch based on the principles of an optical White cell will exemplify an optical cross-connection device for the purposes of describing one or more embodiments of the present invention. The optical White cell is an example of a multi-pass light beam optical system for generating a series of spot illuminations in sequence for an input light beam as will be better understood from the following description. Other examples of multi-pass light beam systems include a Herriot cell or any of the alternative spot pattern generators disclosed in U.S. Pat. No. 6,266,176. For the present example, optical switching is performed by allowing each of a large number of input beams to be switched between two different White cells. One White cell produces two rows of spots for each input beam, and the second White cell incorporates a spot displacement device that will continue the spot image patterns but displace them by some number of rows, thus changing the exit location of each beam.

In the example, a large number of potential outputs is allowed for each of the input beams, but with the smallest possible number of bounces. Reducing the number of bounces reduces the loss, which will accumulate on every bounce. A "binary White cell" in which the number of outputs is equal to $2^m$, where m is the number of bounces in the White cell, will be used by way of example. Two White cells may be combined to produce a suitable binary optical interconnection configuration for the present embodiment as illustrated in FIG. 1.

Figure 1:
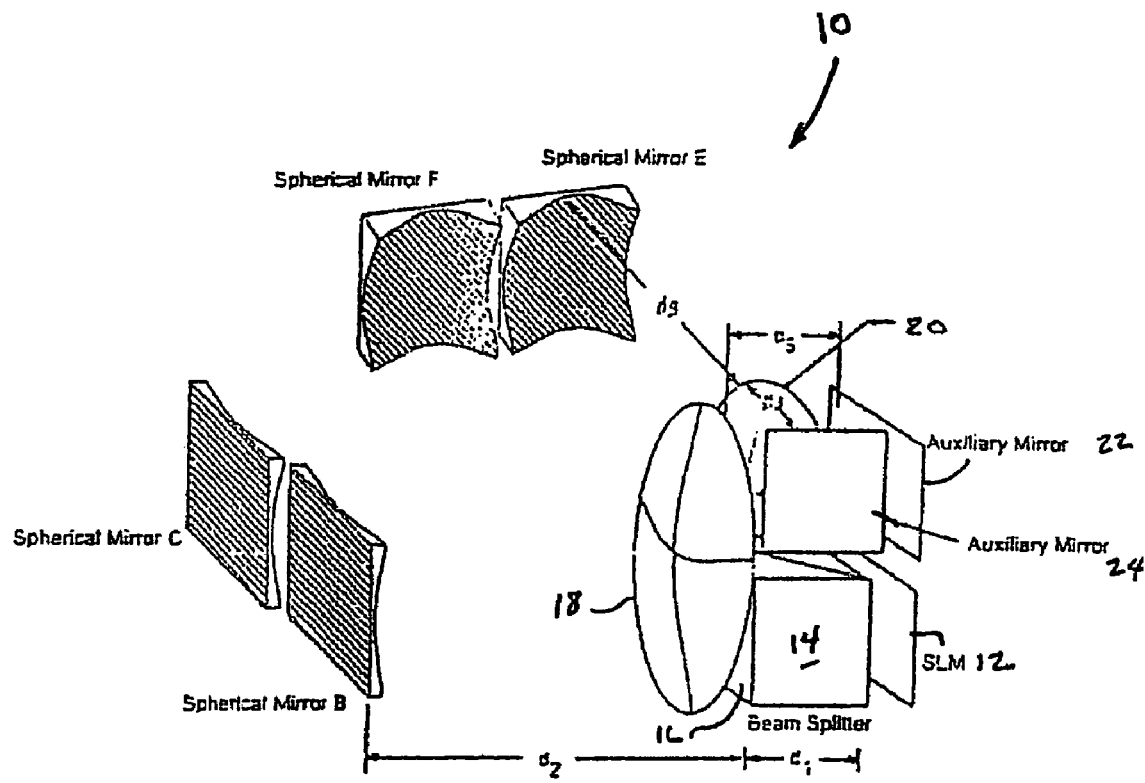
FIG. 1 is an illustration of an exemplary embodiment of a dual White cell configuration.

Referring to FIG. 1, binary optical interconnection configuration 10 uses two White cells united by common optical elements comprising a spatial light modulator (SLM) 12, which may be a polarizing-style spatial light modulator, such as a liquid crystal, for example, and a polarizing beam splitter 14 which may be a cube of dimension $d_1$. The SLM 12 is disposed facing one side of the beam splitter 14. Four spherical mirrors B, C, E and F are included and configured in pairs in which mirrors B and C form one pair, and mirrors E and F form the other pair which is orthogonally disposed to the one pair. The mirror pair of B and C is disposed facing a side 16 opposite the SLM side of the beam splitter 14 and located a distance $d_2$ therefrom, and the mirror pair of E and F is disposed facing a side adjacent the SLM side and side 16 of the beam splitter 14 and located a distance $d_3$ therefrom.

A lens 18 is disposed in front of and in close proximity to side 16 of beam splitter 14 facing the mirror pair B and C. Another lens 20 is disposed in front of and in close proximity to the side adjacent side 16 of beam splitter 14 facing the mirror pair E and F. An auxiliary mirror 22 is disposed above and substantially in the same plane of the SLM 12 and located a distance $d_5$ from side 16 of the beam splitter 14. Another auxiliary mirror 24 is disposed above the beam splitter 14 facing the mirror pair E and F and located a distance $d_4$ from the adjacent side of the beam splitter 14. The surface area of lens 18 is large enough to cover both the side 16 of the beam splitter 14 and the mirror 22, and the surface area of lens 20 is large enough to cover both the adjacent side of the beam splitter 14 and the mirror 24.

One White cell of configuration 10 comprises the spatial light modulator 12, the mirror pair B and C, lens 18 and auxiliary mirror 22. The other White cell comprises the SLM 12, the mirror pair E and F, lens 20 and auxiliary mirror 24. Auxiliary mirror 24 may be replaced with a spot displacement optical element or elements for shifting the spots of light beams incident on it to new positions in the same plane of the auxiliary mirror 24 which will become more evident from the description found herein below. However, for the purposes of describing the operation of the exemplary dual White cell configuration, the auxiliary mirror 24 will be a simple mirror.

An exemplary operation of the dual White cell configuration of FIG. 1 is as follows: a given light beam may enter the dual White cell configuration via a spot on a turning mirror (not shown) and be directed to Mirror B. From Mirror B, the light is focused to a new spot image on the SLM 12 via an optical path through the lens 18 and beam splitter 14. If the SLM 12 does not change the polarization of the light beam, the light beam will be directed to Mirror C on an optical path back through beam splitter 14 and lens 18. From mirror C, the light beam will be imaged as another new spot on auxiliary mirror 22 via an optical path through lens 18. From mirror 22, the light beam is directed back go to the SLM 12 via mirror B over an optical path through lens 18 and beam splitter 14.

If the polarization of the light beam is changed by the SLM 12, then the light beam returning from the SLM 12 will be directed to Mirror E instead of mirror C by the polarizing beam splitter 14. Mirror E will focus the light beam to a spot on the auxiliary mirror 24 via an optical path through lens 20. From mirror 24, the light beam will be directed back to mirror F and from there directed to the SLM 12 over an optical path through lens 20 and beam splitter 14. In the present embodiment, lens 18 images mirror B onto mirror C via the beam splitter 14 and SLM 12, and images mirror C onto mirror B via auxiliary mirror 22. Also, lens 20 images mirror E onto mirror F via auxiliary mirror 24, and images mirror F onto mirror E via the beam splitter 14 and SLM 12. It is known that the even-numbered bounces lie on an auxiliary mirror 22 or 24, and that the odd bounces will lie on the SLM 12.

Figure 2:
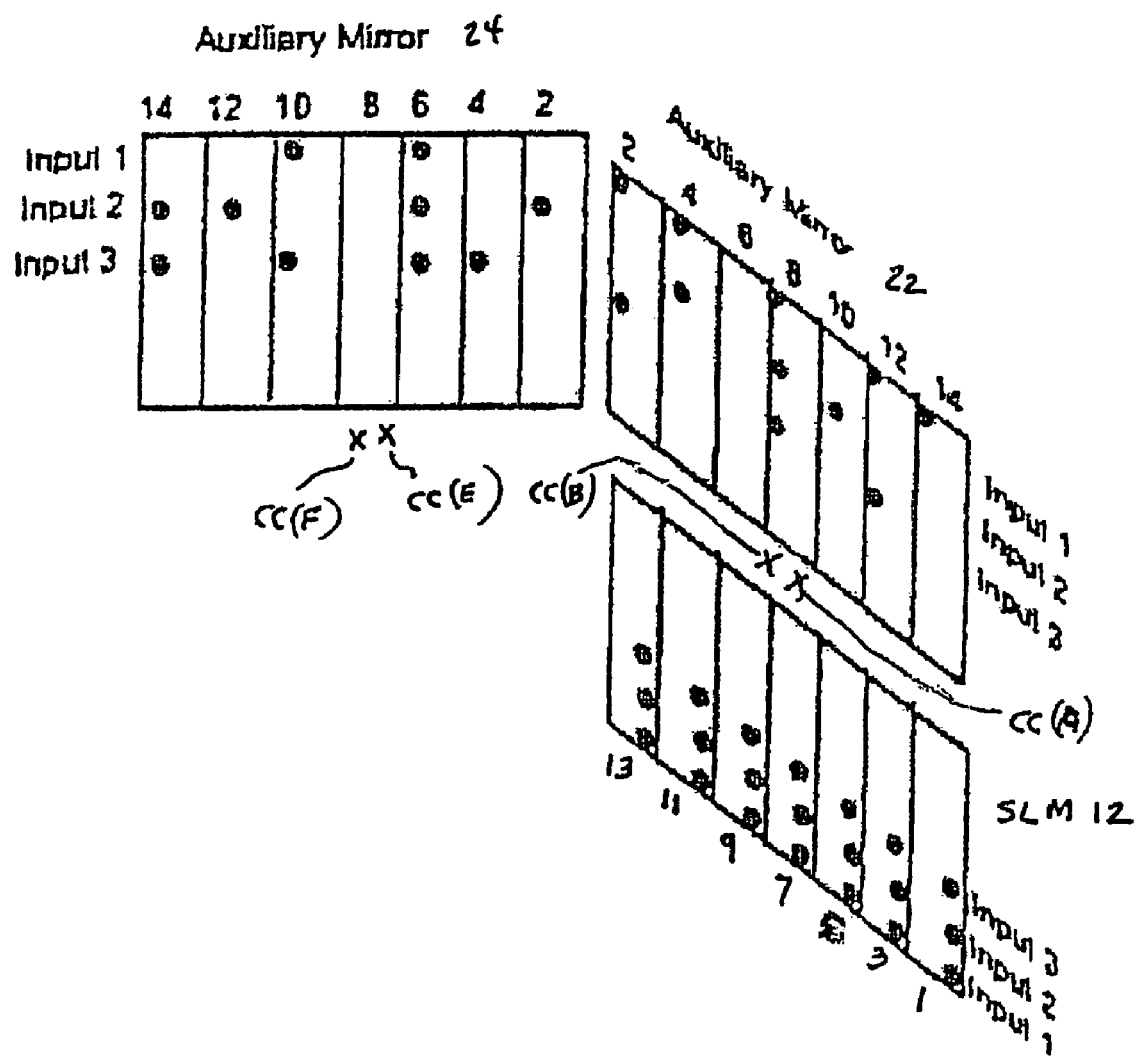
FIG. 2 is an illustration of certain mirrors of the dual White cell embodiment.

FIG. 2 is an illustration of the faces of the mirrors SLM 12, auxiliary mirror 22 and auxiliary mirror 24 showing how the light beam spot image patterns for three input beams are formed thereon. In FIG. 2, the mirror faces are virtually sectioned into columns with respective bounce numbers appearing above each column. Spot images from odd-numbered bounces are formed on the SLM 12, and spot images from the even-numbered bounces are formed on either auxiliary mirror 22 or 24 depending on the state of the pixel at the previous odd-numbered spot. Note that in FIG. 2 the light spots will lie in the virtual columns on auxiliary mirrors 22 and 24. This property will be used to develop the binary interconnection device of the present embodiment.

In FIG. 2, each light beam will trace out an identical spot image pattern on the SLM 12 regardless of which path is chosen. This happens because the center of curvature of mirror B is co-located with that of mirror E, and the center of curvature of mirror C is superimposed on that of mirror F. In previous configurations of White cell optical interconnections, like in U.S. Pat. No. 6,266,176, for example, the spot images were made to shift by aligning the centers of curvature of the mirrors differently. In the present embodiment, the spot images will be made to shift instead by the introduction of a spot displacement device (SDD) in place of auxiliary mirror 24, to be described herein below.

As mentioned above, auxiliary mirror 24 may be replaced with a device that will shift a spot image to a new position on the same plane (in this case a new row on the face of the mirror). The distance by which a spot image is shifted will be different for different columns in the replaced auxiliary mirror 24. Each column may shift a light beam by a number of rows equal to twice that of the previous column, producing a binary counting system.

Figure 3:
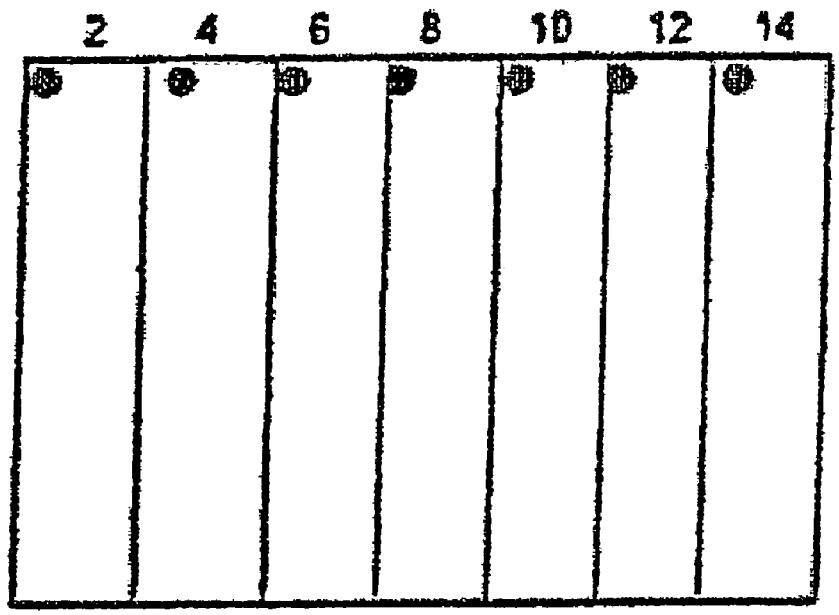
FIG. 3 is a front view illustration of faces of two mirrors of the dual White cell embodiment.
Figure 3:
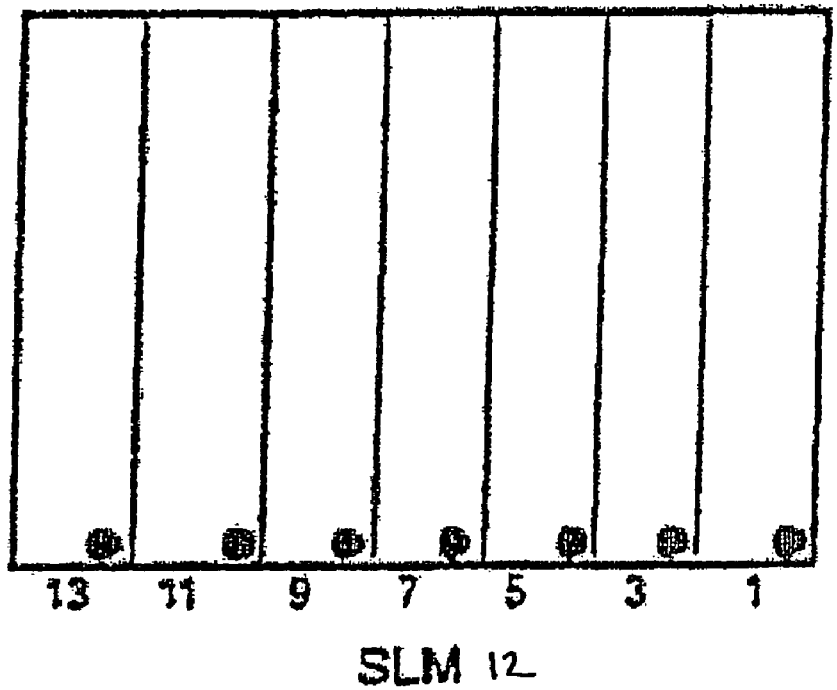

The spot image pattern for a single input beam on auxiliary mirror 24 and on the SLM 12 is shown in FIG. 3. Referring to FIG. 3, the spot images from the odd-numbered bounces form on the SLM 12 on the bottoms of the respective columns, and the spot images from the even-numbered bounces form on auxiliary mirror 24 on the tops of the respective columns (assuming the beam is switched by the beam splitter 14 to auxiliary mirror 24 on every bounce). Also, note that each bounce lands in a different virtual column and the number of virtual columns will depend on the number of bounces (m) that the light beam makes. For example, if there are eight columns on the face of auxiliary mirror 24 (which will correspond to an $2^8 = 256$ different outputs), the light beam will undergo sixteen bounces; eight bounces (odd) may go to the eight columns on the SLM 12 and eight bounces (even) may go to the auxiliary mirror 24.

If the mirror 24 is replaced with a spot displacement device (SDD) as noted above, a light beam going to the auxiliary mirror 24 (or more accurately, its replacement) on the second bounce may be shifted by one row (pixel). Likewise, a light beam incident on the SDD on the fourth bounce will be shifted by two rows, on the sixth bounce by four rows and so on. On any given bounce, if a light beam is not meant to be shifted, it is sent from the beam splitter 14 to auxiliary mirror 22 which does nothing except keep the light beam bouncing.

Figure 4:
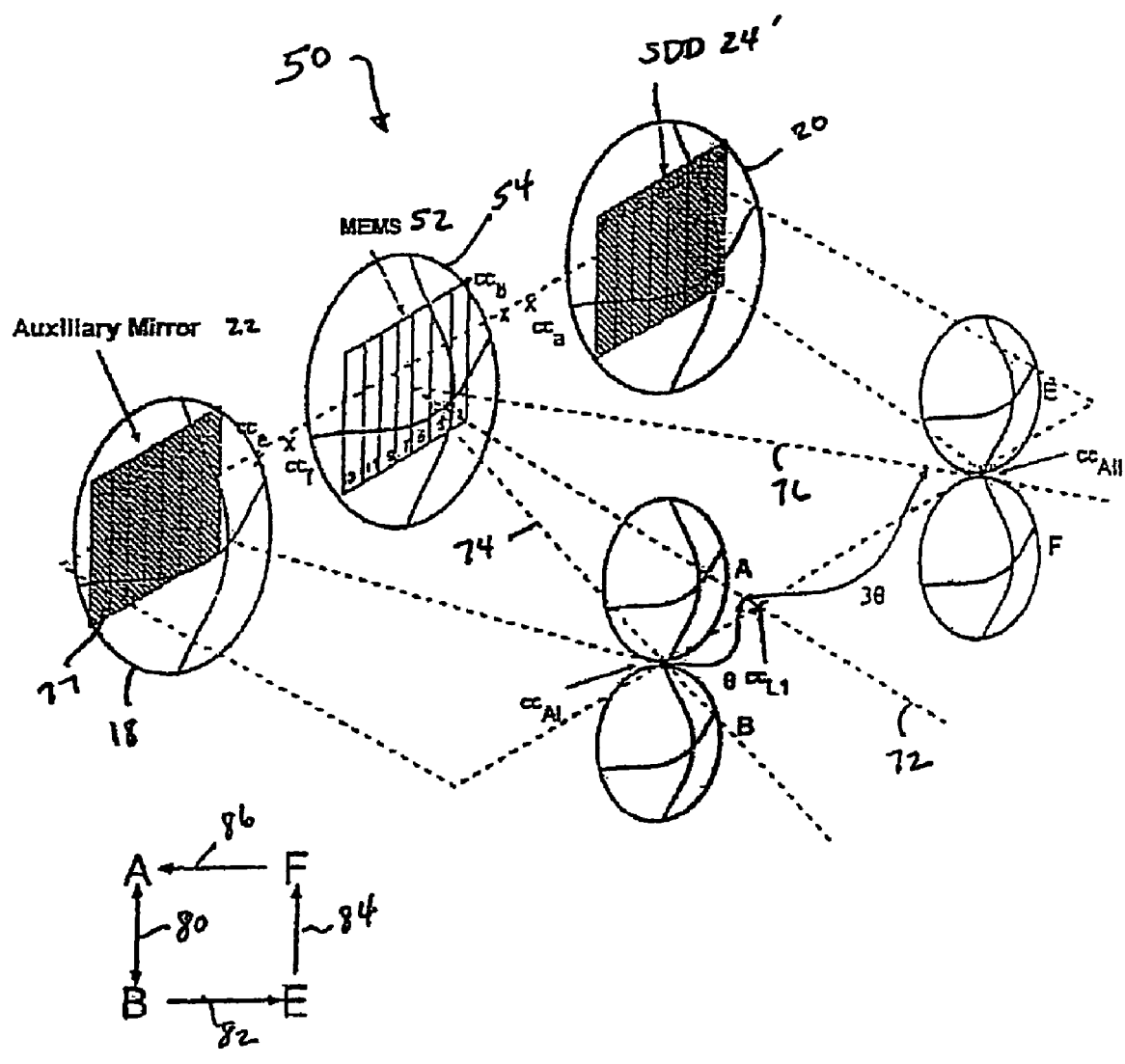
FIG. 4 is an illustration of an alternate embodiment of a dual White cell configuration.

FIG. 4 is an illustration of an alternate dual White cell configuration 50 in which the SLM 12 and beam splitter 14 are replaced with a micro mirror array 52 which may be fabricated by micro electromechanical systems (MEMS) techniques herein after referred to as the MEMS device, MEMS array or MEMS micro mirrors. Reference numerals of optical elements described above in connection with the embodiment of FIG. 1 will remain the same with no further description thereof. Referring to FIG. 4, on one side of the MEMS device 52 is disposed the auxiliary mirror 22, and on the other side is disposed the SDD mirror 24', whose functions will be described shortly. Each of the mirrors 22 and 24' has an associated field lens 18 and 20, respectively.

In the alternate embodiment of FIG. 4, optical light beam switching is performed by allowing each of a large number of input light beams to be switched between two different White cells. In this embodiment, one White cell produces two rows of spot images for each input beam, and the second White cell incorporates the spot displacement device (SDD) 24' that will continue the spot patterns but displace them by some number of rows, thus changing the exit location of each beam. A very large number of potential outputs are provided for each of the input beams, but with the smallest possible number of bounces. Reducing the number of bounces reduces the loss, which will accumulate on every bounce. In a "binary cell," the number of possible outputs is proportional to $2^{m/4}$.

In this alternate embodiment, the dual White cell configuration is modified to control the output location of the spot illumination. To do this, the MEMS tilting micro-mirror array 52 selects between two different paths on each light beam bounce. The two White cells produce a similar spot pattern on the MEMS array 52, but the illuminating spot images resulting from the White cell comprising the SDD 24' are shifted such that they return in a different row of the MEMS array 52 than if they returned from the White cell comprising the mirror 22.

Referring to FIG. 4, as noted above, the SLM 12 and beam splitter 14 are replaced with the MEMS micro mirror array 52 and a field lens 54 disposed in front thereof. The MEMS array/lens combination 52, 54 performs an imaging function. On one side of the MEMS micro mirror array 52 may be disposed the flat auxiliary mirror 22 and associated lens 18, and on the other side is disposed the SDD 24' and the associated lens 20. Each of the auxiliary mirrors 22 and 24' and their associated field lens 18 and 20, respectively, disposed in front thereof function to simulate a spherical mirror. Note that these three field lenses 18, 20, and 54 may be combined into a single, larger lens as well.

The embodiment of FIG. 4 also includes the two pairs of spherical mirrors A, B and E,F disposed in front of the mirrors 22, 24' and 52. In the present embodiment, the possible micro mirror tip angles of the MEMS array 52 may be ±θ to the normal 72 (dashed line) of the MEMS array 52. Mirrors A and B are disposed one above the other, along an axis 74 (dashed line) at an angle of −θ to the normal axis 72. Mirrors E and F are also disposed one above the other along an axis 76 at an angle +3θ to the normal axis 72. While the mirror pairs A,B and E,F of the present embodiment are arranged one above the other, it is understood that the mirrors of each such set may be arranged side by side on either side of the respective −θ or +3θ axis just as well. The axis of the lens 54 associated with the MEMS array 52 is disposed along the normal axis 72; the center of curvature (labeled $CC_{AI}$) of the spherical mirror equivalent to the auxiliary mirror 22 and lens 18 together for a micro mirror tipped to −θ is disposed by design between mirrors A and B, and similarly, the center of curvature $CC_{AII}$ of the SDD mirror 24' and lens 20 for light traveling in the +3θ direction is disposed by design between mirrors E and F.

Let us assume that an input beam going from the plane of the MEMS array 52 is directed to mirror A, for example, after light beam bounce 1. A light image reflected from this spot on mirror A is imaged to a new spot image on auxiliary mirror 22, in a column 77 at the far left thereof as shown in FIG. 4. From there, the light beam is reflected to mirror B, which directs the light beam back to the MEMS array 52 at a new micro mirror location, which may be in the column labeled "3", for example. If the micro mirror at that spot image of the MEMS array 52 is set to −θ, then the light beam is directed back to mirror B again. So, mirrors A and B form one White cell with the MEMS array 52, lens 54, auxiliary mirror 22, and lens 18.

Accordingly, when micro mirror of the MEMS array 52 that the light beam strikes on bounce 3 is tipped to −θ, the light returns to auxiliary mirror 22 via mirror A and may be focused a spot in column 4, for example. On the other hand, if the micro mirror of the MEMS array 52 that the light beam strikes at bounce 3 is instead turned to +θ, then the light beam from mirror B will be reflected from the MEMS array 52 at an angle of +3θ along the plane of axis 76 with respect to the normal axis 72. Recall that there are two more mirrors E and F along the axis 76. So, when the reflecting micro mirror is set at +θ, a light beam from mirror B will be directed to mirror E instead of mirror A. In the present embodiment, a light beam is always directed to an upper mirror A or E from the MEMS array 52.

When a light beam is directed from MEMS array 52 to mirror E, the light beam is refocused to the SDD mirror 24' and forms a spot image in a column 4 of that mirror, for example. From there the light beam is directed to the lower mirror F, and then back to the MEMS plane 52. Accordingly, mirrors E and F together with the MEMS array 52, lens 54, the SDD mirror 24' and lens 20 comprise another White Cell of the embodiment. If the micro mirror in the MEMS array 52 struck by the light beam on bounce 5 is tilted to −θ, the light beam from mirror F is again directed to the other White cell (specifically to mirror A). Conversely, if the same micro mirror at bounce 5 is set tilted to +θ, the light beam from mirror F is instead reflected at +4θ, a direction that is not being used in this design, and the beam is lost.

Thus, according to the connectivity diagram shown in FIG. 4a, in the present embodiment, a light beam shown by the double arrowed line 80 may bounce continuously (and exclusively) between the MEMS array 52 and auxiliary mirror 22 via mirrors A and B, a situation that doesn't occur while bouncing through mirrors E and F. A light beam directed from the mirror B to the MEMS array 52 may be directed either back to mirror A (see arrowed line 80) or to mirror E (see arrowed line 82) depending on the reflection angle setting of the corresponding micro mirror of the MEMS array 52. The light beam arriving at mirror E is returned to the mirror F (see arrowed line 84) via the SDD mirror 24. Then, from mirror F, the light beam is directed back to the MEMS array 52. Note that in the present embodiment, a light beam directed to the MEMS array 52 from mirror F must be directed to mirror A (see arrowed line 86) and auxiliary mirror 22; otherwise, it will be lost. Therefore, the light beam returning from the White cell comprising the SDD mirror 24' needs four bounces to be directed back to itself, i.e. one bounce from the mirror 24' to the MEMS array 52 via mirror F, a second bounce from the MEMS array 52 through mirror A to mirror 22, a third bounce from mirror 22 through mirror B to the MEMS array 52, and a fourth bounce from the MEMS array 52 to mirror 24' via mirror E.

Note also that an input light beam may be sent to mirror A from the MEMS array 52 every even-numbered bounce, and to mirror E every fourth bounce (i.e. 4, 8, 12 ...). Spot images from odd-numbered bounces always appear on the MEMS array 52, and spot images from the even-number bounces can appear either on auxiliary mirror 22 or SDD mirror 24'. The light beam may be directed to The SDD mirror 24' by the MEMS array 52 on any particular even-numbered bounce, but when the light beam is directed there, four consecutive light beam bounces are required before the light beam may be sent to mirror 24' again.

Figure 5:
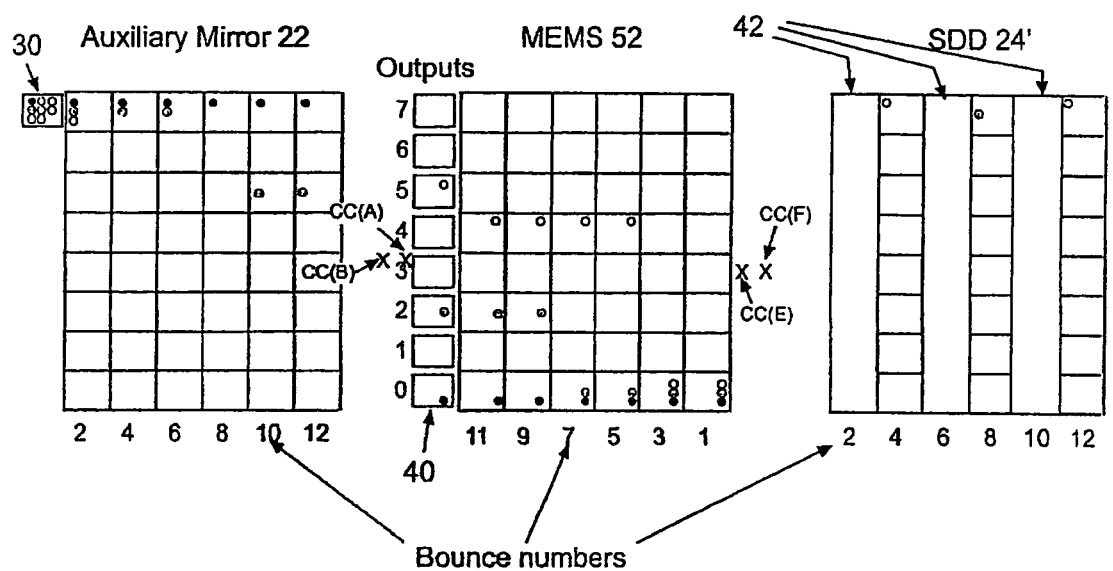
FIG. 5 is a front view illustration of the faces of certain mirrors of the alternate dual White cell embodiment.

In the embodiment of FIG. 4, the spot displacement device (SDD) 24' shifts a spot image over by some number of rows. This embodiment is exemplified in the illustration of FIG. 5. Referring to FIGS. 4 and 5, the SDD 24' may be divided into virtual columns, and each column is assigned to every fourth bounce. Also, the number of elements (pixels) or rows of each column of the array of the SDD 24' by which a beam is shifted will be different for each column. That is, each column may shift a beam by a distance equal to twice that of the shift produced by the previous column. Thus, the first column going from right to left will produce a shift of $\Delta$, the second column a shift of $2\Delta$, the third column a shift of $4\Delta$ and so on, then producing a binary system.

Shifting the spot images can control at which row any given input light beam reaches the output turning mirror and in the present example, each row may be associated with a different output. The number of possible outputs is determined by the total number of possible shifts for a given number of bounces. In the embodiment of FIG. 4, a shift is made every time the light beam is directed to the SDD 24', but this can only happen every four bounces. Thus the number of outputs N is given by:

$$N_{binary} = 2^{m/4} \quad (1)$$

where m is the number of bounces.

In the mirror face diagrams of FIG. 5 is depicted a 12-bounce binary White cell system to illustrate the operation of the embodiment of FIG. 4. In this example, eight different beams, shown by various spot images, are incident on an input turning mirror 30. The patterns for the spot images for three of the eight light beams are indicated in the faces of the mirrors 22, 52 and 24' which are each divided into a grid of eight rows (for eight possible output locations) and six columns (for each bounce on the MEMS). An output column 40 constitutes a seventh column next to the MEMS array 52. In each region or pixel on the grid of the MEMS array 52 may be a group of eight micro mirrors, so that each of the eight beams may land on a different micro mirror on each bounce. Each beam may be directed either to the SDD 24' or to auxiliary mirror 22 on each bounce. The number of columns on the SDD (m/4=3), will thus determine the number of possible outputs; the other columns 42 are not used. Every four bounces allows for a shift, so 12 bounces will produce $2^3=8$ different outputs for each input light beam.

The example of FIG. 5 shows eight different input beams (only three, depicted by white, shaded and black symbols, being addressed in the present example) and eight possible outputs (numbered rows 0 to 7) in the output column 40. Initially, the three input beams start on row zero (0). Remember that according to the connectivity diagram of FIG. 4a, an input light beam may only go to the E, F White Cell every fourth bounce (those would be the 4th, 8th and 12th bounces for a 12 bounce system). In the present example, suppose that the "white" beam is to be directed to the fifth output (row 5 of column 40), the shaded beam is to be directed to the second output (row 2 of column 40), and the black beam is to be directed to row 0 of column 40. The spot images of the three beams are shown in the respective mirror face for each bounce and the bounce numbers are shown beneath the columns of the mirror faces.

In operation, the "white" beam should be directed to the SDD 24' on the fourth and twelfth bounces, which correspond to row displacements of $4\Delta$ and $\Delta$, respectively. Accordingly, the "white" beam may initially bounce in the A, B White Cell (i.e. the corresponding micro mirrors on the MEMS array 52 are tilted to $-\theta$ position) for three bounces. Then, the "white" beam is directed to the SDD 24' on the fourth bounce (i.e. the corresponding micro mirror on the MEMS array 52 is tilted to $+\theta$), and more particularly to the column in the SDD 24' that has a shift value of $4\Delta$. After being shifted four rows in the SDD 24', the "white" beam is directed back to the MEMS array 52 on the fifth bounce and images on the row four (4) instead of row zero (0). The "white" beam is then kept bouncing in the A, B White cell, until the 12th bounce, when it is again directed to the SDD 24', and more specifically directed to land in the column with the shift value of $\Delta$. After being shifted an additional row in the SDD 24', the "white" beam is directed back to the MEMS array 52 on the next bounce and images on the row five (5) of the output column 40.

In a similar manner, the "shaded" beam may be shifted to the row two (2) of the output column 40 in twelve bounces (12). The "black" beam may be left unshifted throughout the 12 bounces to be output at row zero (0) of the output column 40.

Figures 6, 6A:
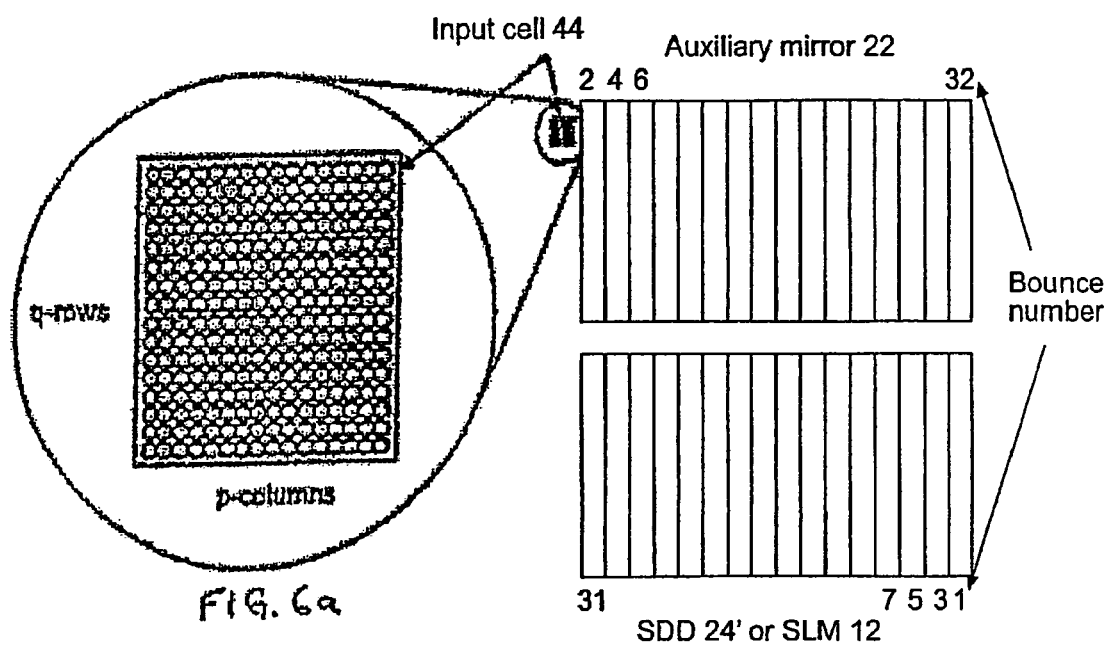
FIG. 6 is a front view illustration of the faces of two mirrors of the alternate dual White cell embodiment.
FIG. 6a is an exploded front view of an input cell of the alternate dual White cell embodiment.

So far the input to the configuration has been treated as a single beam. Instead of a single beam, let's assume that the input is an array of independent beams that may be referred to as the "input cell" 44 (see FIG. 6a). Typically, there may be as many beams in the input cell 44 as outputs in the system. Each beam in the input cell will be directed to a specific output (and in general a different output than other beams). FIG. 6 illustrates an exemplary input cell 44, for a 32-bounce system ($2^{32/4}=256$ outputs). The input cell 44 may have a fixed number of columns and rows (i.e. 256×1, 128×2, 64×4, 16×16) as shown in the illustration of FIG. 6a.

To find the optimum shape of the input cell we need to consider the final size of the SLM 12 or micro mirrors in the MEMS device 52 employed on the White Cell. For ease of manufacturing, it is preferable to have a square-shaped SLM 12 or MEMS array 52. Thus, a relationship between the dimensions of the input cell 44 to the dimensions of the SLM 12 or MEMS array 52 will be determined. To do so, the number of spot image positions in the input cell 44 as a function of the number of bounces should be found. For any input cell, the number of spot positions or pixels (p q) is equal to the number of outputs ($2^{m/2}$), which may be formulated in the following equation:

$$pq = 2^{m/4} \quad (1)$$

where m is the number of bounces on the White Cell.

The number of spot positions on the MEMS array 52 (or SLM 12) is a function of the number of outputs, and therefore of the number of bounces. Let's call X the number of spot positions on the vertical direction and Y the number of spot positions or micro mirrors on the horizontal direction on the MEMS array 52. So for any number of bounces the number of spot positions is:

$$X = p2^{m/4} \quad (2)$$

and $$Y = q\frac{m}{4} \quad (3)$$

So in order to have X=Y (a square MEMS array):

$$p2^{m/4} = q\frac{m}{4} \quad (4)$$

Substituting equation (1) into (4), after some simple manipulation we have:

$$p = (m/4)^{1/2} \quad (5)$$

For a 32 bounce system (256 outputs) p=2.828, which can be rounded to 3 to have a input cell of 3×85 (actually it would be two columns of 86 spots plus one of 84 spots).

Next will be discussed how the shifts are produced in the substituted spot displacement device (SDD) 24'. Recall that the objective is to treat each virtual column on the face of SDD 24' as an independent entity. A spot image from a light beam landing anywhere on the first column of the SDD 24' will experience a displacement of Δ. This shifts the spot image onto the next row of the SDD 24'. A spot image directed to the second column will be shifted by a displacement of 2Δ (2 rows), a spot image directed to the third column will be shifted by 4Δ and so on.

Figure 7:
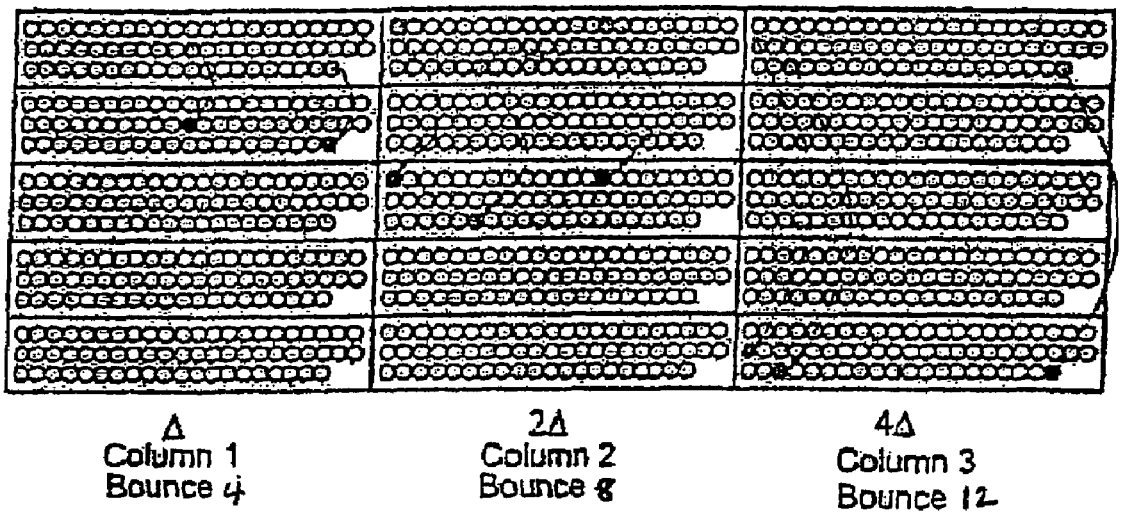
FIG. 7 is a front view illustration of the face of a spot displacement device suitable for use in the alternate dual White cell embodiment.

FIG. 7 is an illustration of the face of the SDD 24' showing the columns 1, 2 and 3 corresponding to Δ, 2Δ and 4Δ spot displacements. In this example, column 1 produces a shift of Δ. For a 12-bounce system, columns 1, 2 and 3 correspond to light beam bounces 4, 8 and 12, respectively. It can be seen that the displacement pitch that the SDD 24' has to produce is not from spot to spot, but from an entrance cell array to an exit cell array. So the SDD 24' that causes a shift of 4Δ, is translating a particular spot image (represented by an open circle) on an entrance cell array to a spot image (darkened circle) at the same array position on an exit cell array four units or rows down on that particular SDD column, see arrowed lines in FIG. 7, column 3. The arrowed lines in FIG. 7 represent the spot displacements taking place for each column 1, 2 and 3 from an entrance cell array to an exit cell array as will become more evident from the following description.

Each column on the SDD 24' will have a corresponding column on auxiliary mirror 22. Thus, as illustrated in FIG. 4, if no displacement is desired on a particular bounce, the light beam is directed from MEMS array 52 to auxiliary mirror 22 (this will represent a '0' in a binary counter). If a particular spot displacement is desired, the light beam may be directed from MEMS array 52 to a specific column on the SDD 24' (this will represent a '1' in a binary counter). Therefore, we can add zeros and ones for an n-bit binary SDD 24' with the following design criteria:

Each column of the SDD 24' has to produce double the spot displacement of the previous column (1 for the first one);

The time it takes a light beam to propagate through one White Cell and the SDD 24' should be the same as the transit time through the other White Cell via Auxiliary Mirror 22; and Beams in a specific column on the SDD 24' should not overlap to any adjacent column.

Imaging conditions also need to be fulfilled. The SDD 24' may be analyzed independently from the White Cell. The SDD 24' may change the position of the light beam and still meet the imaging conditions of the White Cell, as long as the properties of the light beams at the input and output of the SDD 24' are the same (e.g. spot size, angle of propagation, . . . etc.). Based on these conditions, four different embodiments of the SDD 24' are presented below by way of example. They are: 1) a roof prism; 2) a concatenated prism; 3) a lens train and 4) a waveguide SDD. All of them cause a spot displacement from the entrance cell array to the exit cell array in the same plane as shown in the illustration of FIG. 7.

Figure 8:
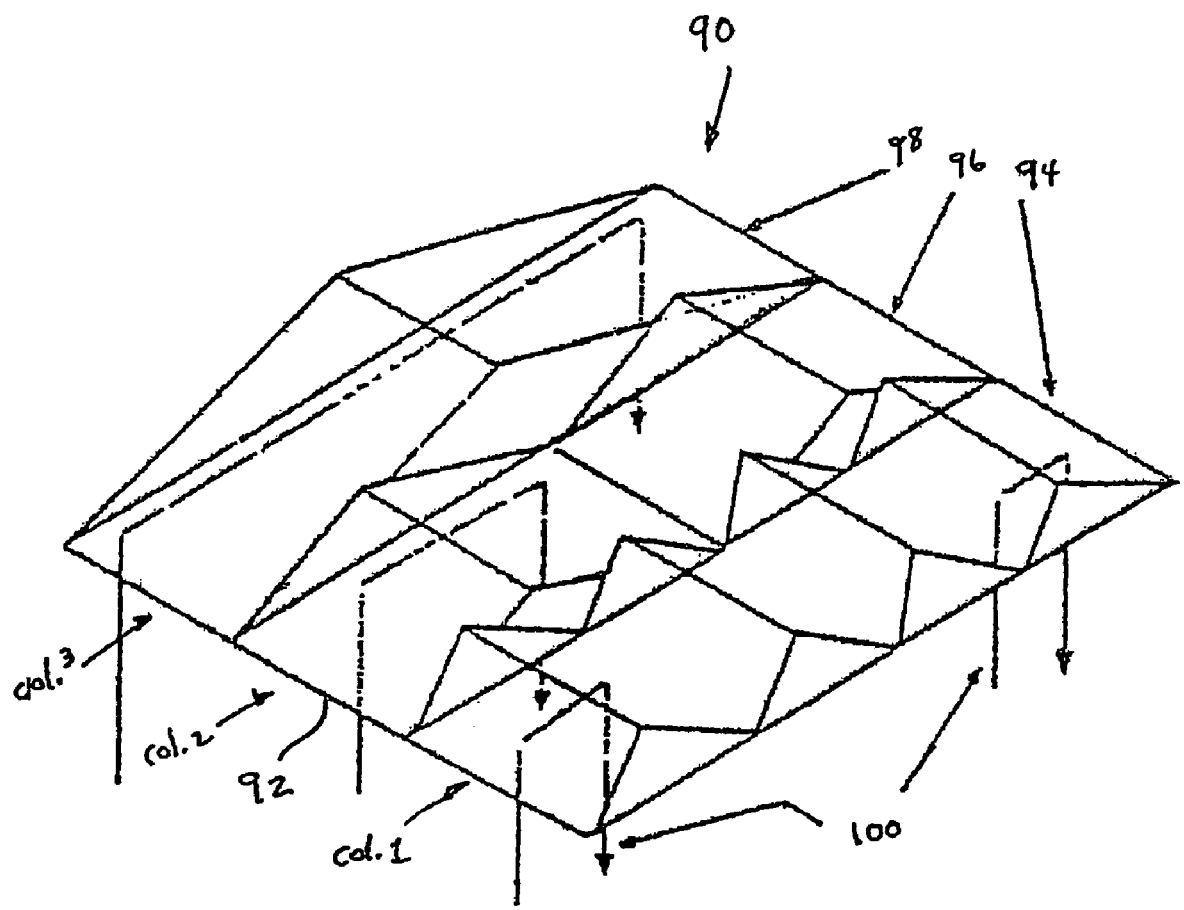
FIG. 8 is an isometric perspective view of an exemplary prism embodiment of a spot displacement device.

One approach to generating a spot displacement in the SDD 24' is by using prisms disposed on the face thereof. The total internal reflection (TIR) caused by a prism may be taken advantage of to change the position of the input light beam to any desired position. TIR may occur when the incident light beam is in a higher refractive index medium striking an interface with a lower index medium at an angle greater than the critical angle. In this case, the light beam is reflected into the incident medium without losses. In FIG. 8 is shown an embodiment 90 for the SDD 24' using roof prisms.

Referring to FIG. 8, disposed on the face 92 of the SDD 90 on each column 1, 2 and 3 are prisms 92, 94 and 98, respectively. The prisms 96 of column 2 have a base area twice as long as the prisms 94 of column 1, and the prisms 98 of column 3 have a base area twice as long as the prisms 96 of column 2 and so on. In order to prevent the light beams 100 of the input cell from overlapping to adjacent prisms of the same column while traveling through their correspondent prism, a light beam with a low divergence is desired at an input plane of the SDD 90. To decrease the divergence of the beam at the input plane, an array of micro lenses may be used.

Figure 9A:
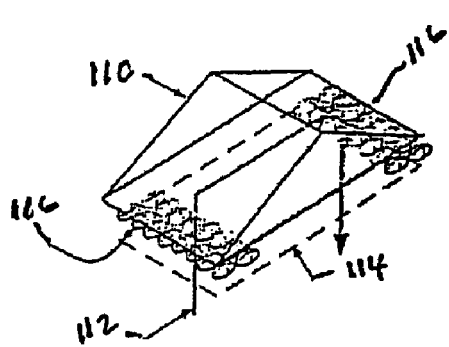
FIGS. 9a and 9b are isometric and side cross-sectional views, respectively, of a roof top prism assembly suitable for use in the spot displacement device of FIG. 8.
Figure 9B:
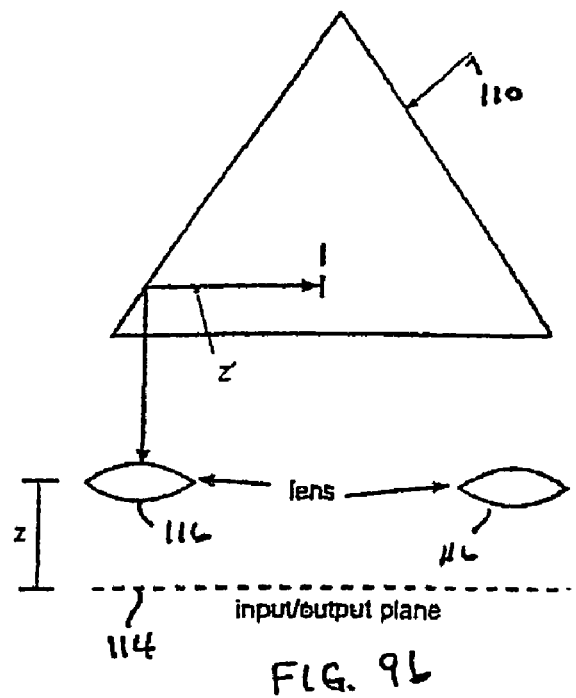

FIGS. 9a and 9b are isometric and side view perspectives of an exemplary prism 110 on the face 92 of the SDD 90. As shown in FIGS. 9a and 9b, a light beam 112 coming from a White Cell is focused at an input/output plane 114. A micro lens array 116 is disposed a distance z beyond the plane 114. The distance from the input plane 114 to the lens 116 will depend of the focal length of the lens, but the beam 112 should be preventing from diverging so much that it overlaps with adjacent beams (not shown).

The location of the light beam waist can be calculated with equation 6:

$$\frac{z'}{f} - 1 = \frac{\frac{z'}{f} - 1}{\left(\frac{z'}{f} - 1\right)^2 + \frac{z_0^2}{f}} \tag{6}$$

where z' is the location of the new beam waist, $z_o$ is the Rayleigh distance and f is the focal length of the lens 116. Equation 6 will have a maximum and minimum distance at which the new beam waist will be placed. The beam's divergence will be reduced by making the location of the new waist z' as distant as possible from the lens 116. This is achieved by using the smallest ratio $$\frac{z_o}{f}$$

(short depth of focus and long focal length). It may be possible, depending on the beam characteristics, that several lenses may be needed, spaced at equal intervals, to produce longer shifts.

Figure 10:
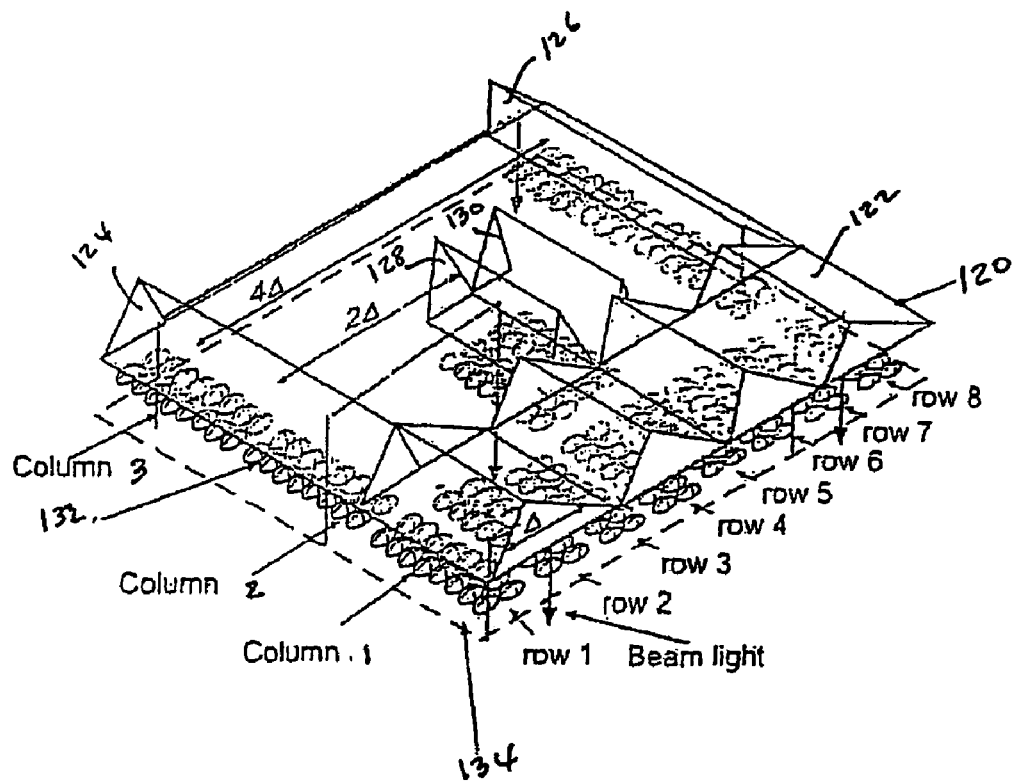
FIG. 10 is an isometric perspective view of an alternate prism embodiment of a spot displacement device.

FIG. 10 is an isometric view illustration of an alternate embodiment 120 of a roof prism SDD showing the columns 1, 2 and 3 corresponding to respective spot displacements of Δ, 2Δ and 4Δ. Note that in column 1 of the SDD embodiment 120, complete prisms 122 are used. However, for columns 2 and 3, instead of using a complete prism, only the surface of each prism at which the light beam makes contact with the prism is used. For example, at columns 2 and 3, one solid prism piece 124 is disposed at one end of the SDD at a light beam entry port and one solid prism piece 126 is disposed at the other end of the SDD at a light beam exit port. Thus, at column 3, only prism pieces 124 and 126 are used to impose a 4Δ spot displacement between light beam entrance and exit regions thereof. At column 2, however, an additional prism piece 128 is disposed on the SDD at a light beam exit region of column 2 a distance from the entrance prism piece 124 to yield a 2Δ spot displacement of the light beam, and an additional prism piece 130 is disposed on the SDD at another light beam entrance region of column 2 a distance from the exit prism piece 126 to yield a 2Δ spot displacement of the light beam. Micro lens arrays 132 may also be disposed between the input/output plane 134 and prisms in much the same manner as described in connection with the embodiment of FIGS. 9a and 9b.

Figure 11:
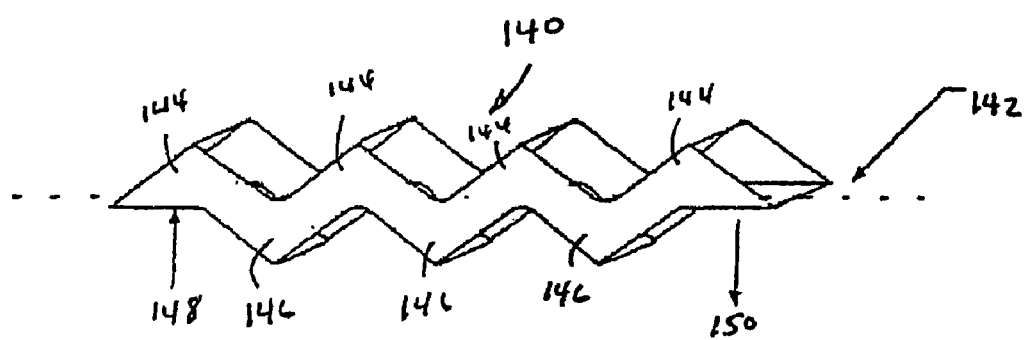
FIG. 11 is an isometric perspective view of another alternate prism embodiment of a spot displacement device.

Another embodiment for the SDD 24' referred to as the concatenated prism embodiment is also based on the use of total internal reflection. In this embodiment, several prisms may be joined together, so that the light traveling inside the joined prisms will experience TIR at the boundaries where the incident angle is greater than the critical angle. An exemplary concatenated prism embodiment 140 is illustrated in FIG. 11. Referring to FIG. 11, the prisms are joined together along an input/output plane 142 such that every other prism 144 has its apex above the plane 142 and the in between prisms 146 have their apexes below the plane 142. Thus, by changing the apex angle of the adjacent prisms 144 and 146 in the present embodiment, a light beam may be directed from an input 148 to an output 150 so it undergoes the desired shift or spot displacement. TIR guarantees that the intensity on the output plane will remain the same as in the input plane. But TIR doesn't stop the beam from diverging, so additional lenses may be added similarly to the embodiment described above in connection with FIGS. 9a and 9b.

Figure 12B:
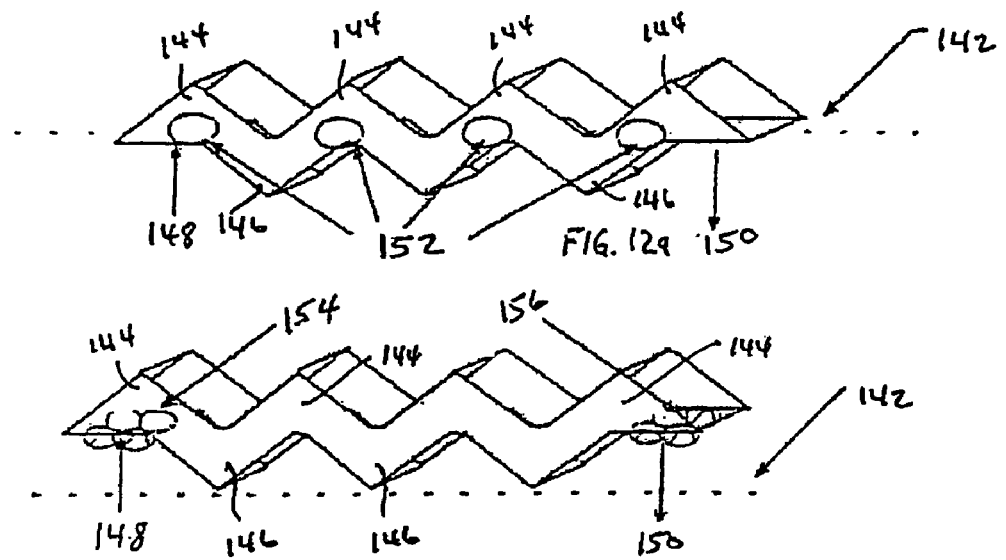

One possible lens placement is shown in the illustration of FIG. 12a in which lenses 152 are disposed between every other prism 144 so that the light beams are confined in size throughout the shift. Another possible lens placement is shown in the illustration of FIG. 12b in which an array of micro lenses 154 is disposed beyond the plane 142 at the input 148 and another array of micro lenses 156 is disposed just prior to the plane 142 at the output of the SDD. With this configuration, the light beams will decrease their divergence preventing them from overlapping into other columns.

Figure 13:
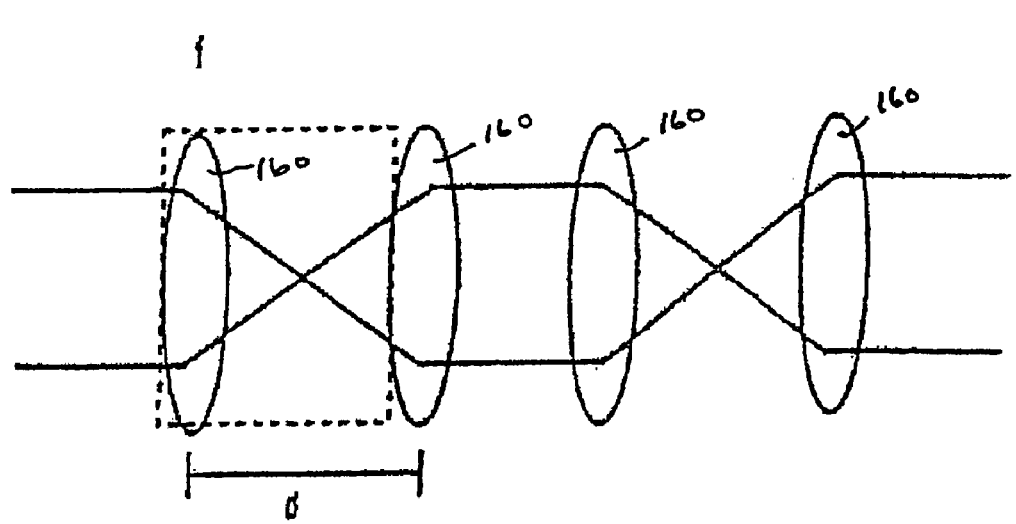
FIG. 13 is an isometric perspective view of a lens train embodiment of a spot displacement device.

Yet another embodiment of the SDD 24' is based on an optical waveguide built with lenses and referred to as a lens train. In FIG. 13 is shown a train of identical lenses 160 of focal length f separated by a distance d. To show that this train or set of lenses is stable, the system may be analyzed for a unit cell, whose ray matrix T is defined as follows:

$$T = \begin{bmatrix} 1 & d \\ -\frac{1}{f} & 1 - \frac{d}{f} \end{bmatrix} \tag{7}$$

We now apply the stability condition as defined below:

$$-1 \le \frac{A + D}{2} \le 1 \tag{8}$$

where A is the element [1,1] of the matrix T and D is the element [2,2] of the same matrix. Substituting eq. 7 into eq. 8 we have:

$$0 \le d \le 4f \tag{9}$$

The lens train will be stable as long as the distance between the lenses doesn't exceed 4f. But it is preferred not to use a lens train on the SDD's input/output plane. It is desirable to take advantage of the stability of the train lens, but instead of lenses it is preferred to use spherical mirrors as shown in the lens train embodiment of FIG. 14.

Figure 14:
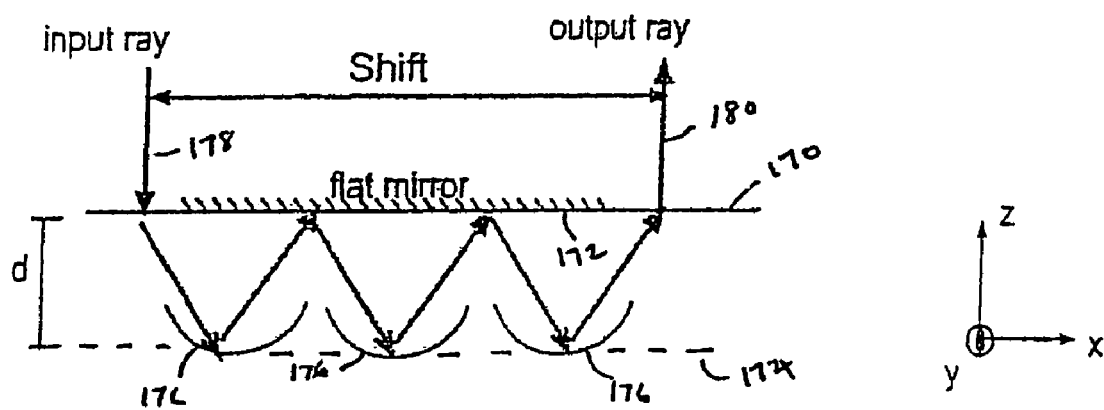
FIGS. 14 and 15 are side cross-sectional views of alternate lens train embodiments of a spot displacement device.

The lens train embodiment of FIG. 14 may be divided into two planes, an upper plane 170 comprising a flat mirror 172, and a lower plane 174 (dashed line) comprising a series of spherical mirrors 176, each with focal length f. The distance d between the two planes 170 and 174 is chosen such that it doesn't exceed 4f, for stability. For the beam to travel the correct distance in the x direction, the beam should be incident in the spherical mirrors 176 with a fixed angle θ. However, the beams may enter the SDD at 178 and exit 180 at angles determined by the White Cell.

Figure 15:
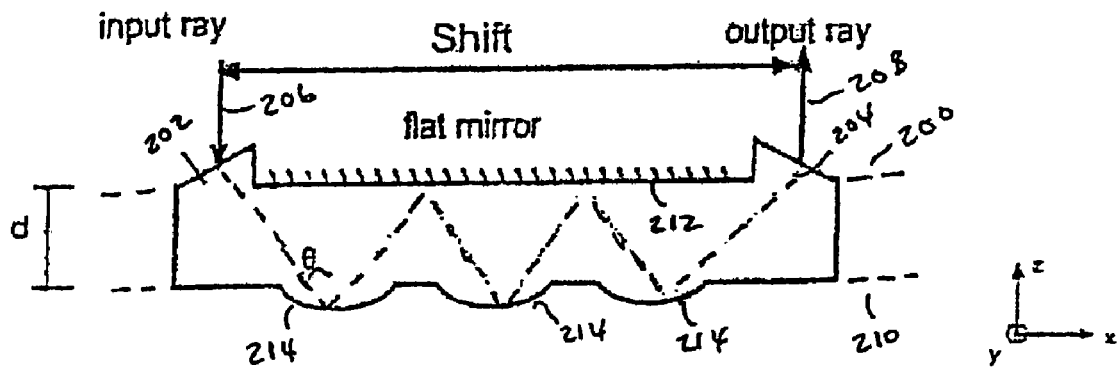

FIG. 15 is an illustration of an alternate lens train embodiment of the SDD 24'. The alternate lens train embodiment comprises an input/output plane 200 that includes prism-shaped optical elements 202 and 204 at entrance and exit light beam paths 206 and 208, respectively. The prism-shaped optical element 202 is configured to direct the input light beam to a first spherical mirror with an angle θ by refraction. As shown in the illustration of FIG. 15, the alternate embodiment includes two planes 200 and 210, plane 200 comprising a plane mirror 212, and plane 210 comprising a series of spherical mirrors 214 that refocus the light beam after each bounce.

Referring to FIG. 15, in the alternate lens train embodiment, the input light beam is incident upon the upper plane 200 and is refracted or tilted by the prism-shaped element 202 to a fixed angle θ. The light beam is caused to progress from spherical mirror 214 to flat mirror 212 back to spherical mirror 214 in the x direction, while being refocused by the spherical mirrors 214. The light beam may exit the SDD through the same plane 200 as it entered; the only difference is that the position along the x axis has changed. This change in position will represent, eventually, a fixed spot displacement on the MEMS array.

Figure 16:
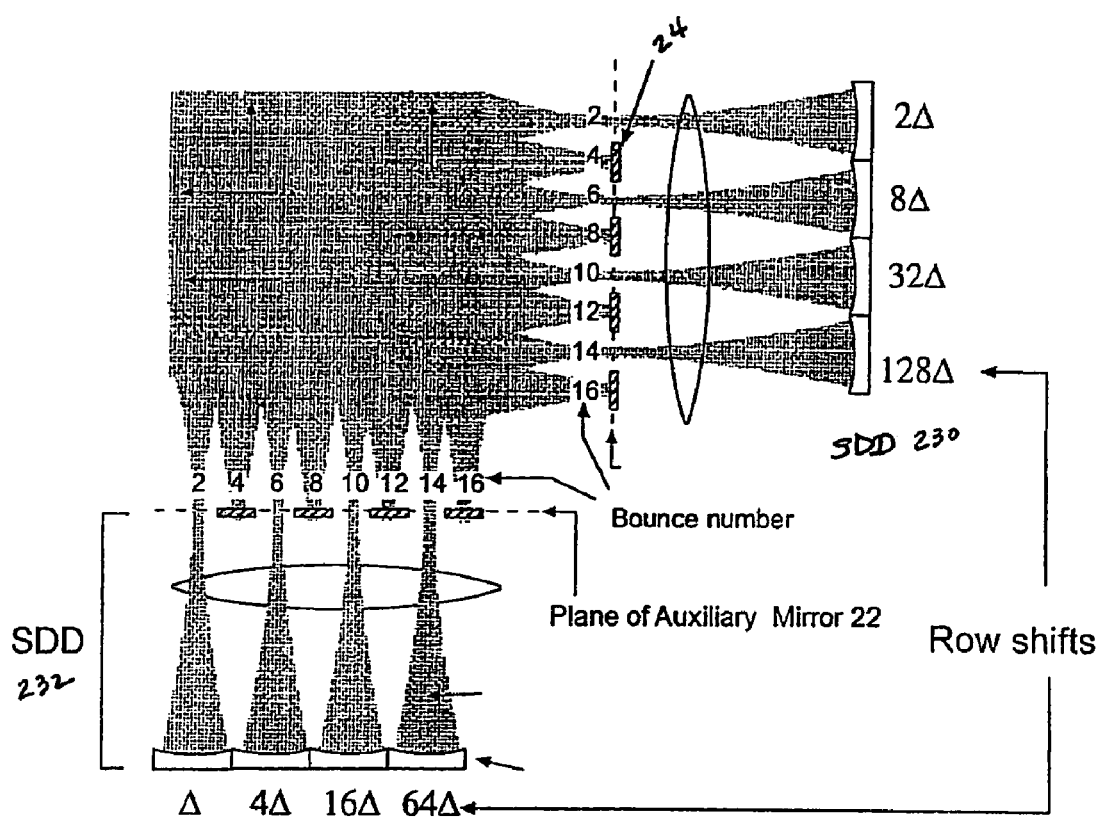
FIG. 16 is a top view illustration of another alternate lens train embodiment of a spot displacement device.

The distance d from plane 200 to plane 210 may be again limited by the divergence of the beam. To calculate the distance d, the spot size at the input plane 200 should be considered. The smaller the spot size at the input plane 200, the faster the divergence and the smaller d can be. One way to overcome this condition is to use the embodiment illustrated in FIG. 16 in which every other column on auxiliary mirror 24 is replaced with a SDD 230 and the complementary columns on the plane of auxiliary mirror 22 are replaced with another SDD 232. So, in this embodiment there is twice the space in the y direction behind each mirror plane 22 and 24 so the beams can diverge without overlapping. The columns between the SDD may be simple flat mirrors. In fact, the columns of auxiliary mirrors 22 and 24 may be interleaved. Therefore, the distance d in FIG. 16 will be determined as the distance in which the size of the beam at the input plane on the SDD will double (without d exceeding the limit 4f). The beam radius at the lower plane is calculated by equation 10:

$$w(d) = w_0 \frac{2}{\ }\left(1 + \left(\frac{d}{z_0}\right)^2\right) \quad (10)$$

where w(d) is the final beam radius, $w_o$ is the waist radius at upper plane, d is the distance from the beam waist to the second plane and $z_o$ is the Rayleigh distance, $\pi\omega_0^2/\lambda$, where λ is the wavelength. In order to make w(d) twice $w_o$, the distance d is then defined as:

$$d=\sqrt{3z_0}. \quad (11)$$

The final size of this embodiment of the SDD will depend on the spot size at the input plane. The bigger the spot size, the lower the divergence will be, also the lower the astigmatism will be. Astigmatism is of concern because it can cause an elliptical spot shape which will cause coupling losses when going into a fiber, for example, at the output of the interconnection device.

There are ways to reduce the astigmatism on the SDD. One way involves the use of cylindrical lenses instead of the spherical lenses 214 in the lower plane 210 of the embodiment described in connection with FIG. 15. Cylindrical lenses can reduce the astigmatism on each bounce, but the cost of each mirror may be higher. Another possible way is to make d as high as possible, so we can have a small angle of incidence. The astigmatism is inversely proportional to the spot size at the input plane 200. So we can decrease the astigmatism simply by magnifying the spot size prior to the SDD's input plane and decrease its size after the SDD's output plane.

Astigmatism is analyzed in Appendix A to this specification.

In the lens train SDD embodiment, losses are generated during the multiple bounces inside the SDD. This is because the mirrors have finite reflectivity, as opposed to the TIR embodiments described herein above. Assuming 256 bounces, and a reflectivity of 0.995 for each mirror inside the SDD, a loss of: (0.995)256=0.2771 is likely to occur, which represents a loss of 5.57 dB. If a 0.999 reflecting coating is assumed, the losses are reduced to 1.11 dB, but the cost may increase.

Yet another embodiment of the SDD 24' involves combining the already established manufacturing techniques of semiconductor devices, and simple geometric shapes, yielding an embodiment that is highly scalable, and of simple manufacture based on waveguides. This SDD embodiment uses waveguides rather than freespace as in foregoing described embodiments. The basic principle for a waveguide involves a medium of a particular refractive index that is surrounded by another material or materials with a lower refractive index. The light is transmitted through the inner medium (core) and by total internal refraction at the boundaries a light beam can travel long distances.

Figure 17:
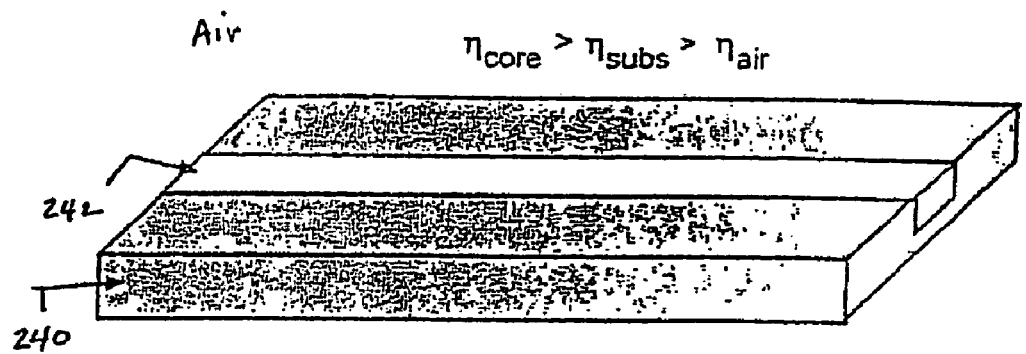
FIGS. 17 and 18 are isometric perspective views of an exemplary optical waveguide.
Figure 18:
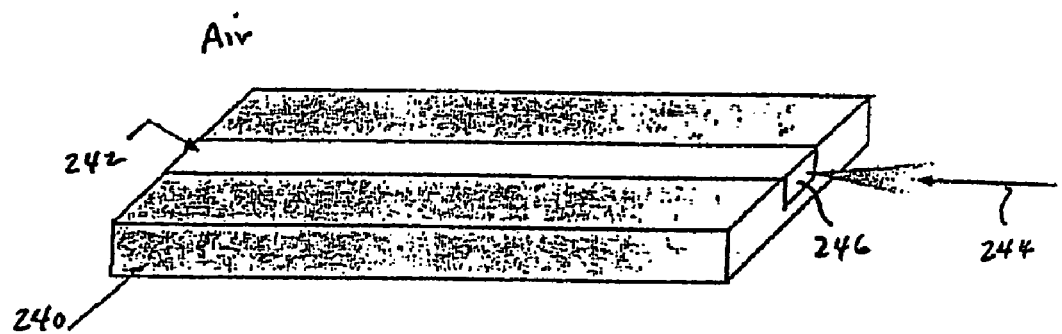

FIG. 17 is an isometric view of an exemplary waveguide having three materials: a substrate 240, a core 242 disposed through the substrate 240, and air surrounding the substrate. The refractive index of the substrate 240 will be lower than the one for the core 242 (the air refractive index will be assumed as 1, and therefore, the lowest in any case). In order for an external light source to excite a waveguide mode, the source mode should match any of the modes that the waveguide can propagate. Light may be coupled into the waveguide by directly focusing a beam 244 at one end 246 of the core 242 as shown in FIG. 18. To excite a given mode, the transverse distributions of the incident light 244 should match that one of the waveguide mode. Because of the small dimensions of the waveguide, focusing and alignment are usually difficult and inefficient.

Figure 19:
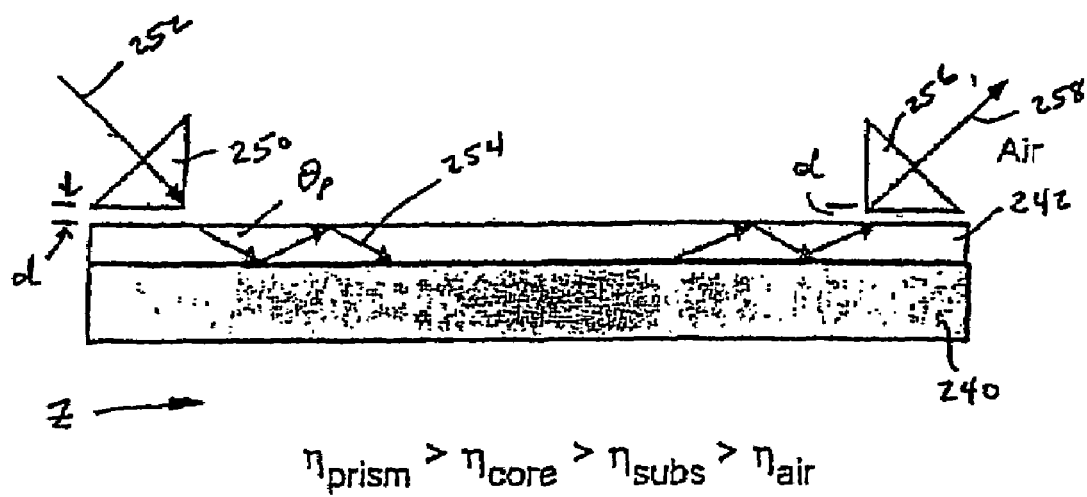
FIG. 19 is a side cross-sectional view of an exemplary waveguide section for use in a waveguide-based spot displacement device.

One way to increase this efficiency is to use what is referred to as a prism coupler. FIG. 19 is a cross-sectional view of the exemplary waveguide including a prism 250 with refractive index higher than the core 242 ($n_p > n_c$) disposed a distance d above the core 242. Under proper conditions, an input beam 252 incident to the prism 250 undergoes a total internal refraction within the prism 250 and may be coupled into the core 242 at an angle $\theta_p$. Resulting incident and reflected waves form a wave 254 traveling in the z direction through the core with a propagation constant:

$$\beta_p = n_p k_o \cos\theta_p \quad (12)$$

Where $n_p$ is the refractive index of the prism 250 and $k_o$ is defined as:

$$k_o = 2\pi/\lambda_0 \quad (13)$$

where $\lambda_0$ is the beam wavelength.

The transverse field extends outside the prism and decays exponentially in the space separating the prism and the core. If d is sufficiently small, the beam or wave is coupled to a mode of the waveguide with a matching propagation constant $\beta_p \approx \beta_{wg}$, where $\beta_{wg}$ is given by equation 14:

$$\beta_{wg} = \sqrt{k_0^2 n_{core}^2 - k^2} \quad (14)$$

where k is the effective refractive index and may be found by graphical methods.

The foregoing described operation may be reversed to make an output coupler, which extracts a light beam 258 from the waveguide as shown in the illustration of FIG. 19. Another prism 256 may be disposed a distance d above the core 242 at the output coupling region. In the output coupler, the spacing d between the prism 256 and the waveguide should be precisely controlled.

Figure 20:
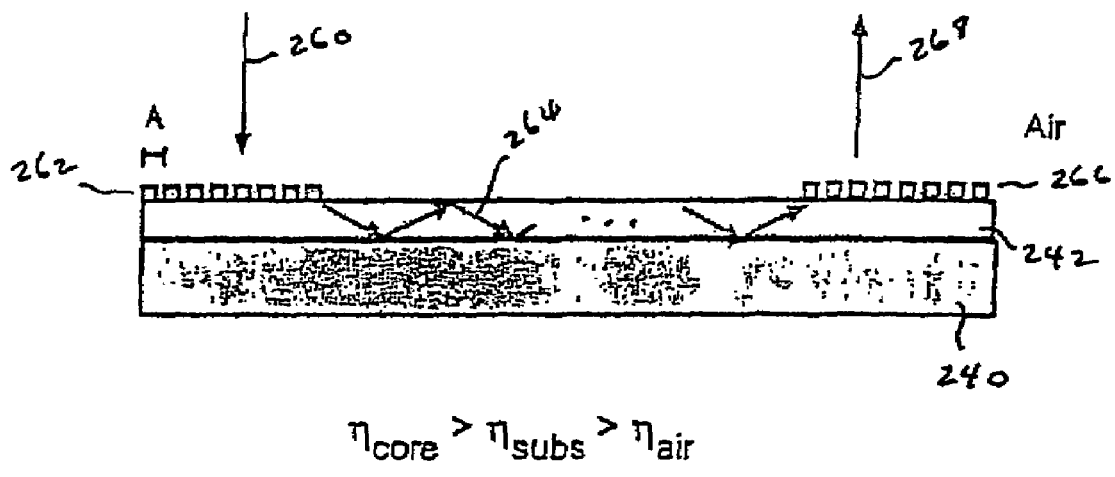
FIG. 20 is a side cross-sectional view of an alternate waveguide section for use in a waveguide-based spot displacement device.

There is another approach to coupling an optical beam 260 coming from a normal incidence angle into the waveguide by using diffraction gratings as shown in the cross-sectional view of FIG. 20. In embodiment of FIG. 20, an input grating coupler 262 is disposed above the core 242 at an input region of the waveguide, preferably by etching. The incident beam 260 strikes the grating 262 and is divided into several modes. One of these modes may match the mode that propagates into the waveguide so coupling may be achieved. Preferably, the light beam 260 should be coupled from a normal incident angle into the waveguide; then, a light beam 264 may travel along the core 242 of the waveguide. Another diffraction grating 266 may be disposed above the core 242 at an output region of the waveguide, preferably by etching, so that the traveling light beam 264 will propagate through the core 242 until the other or output grating 266 is reached. At that point, a light beam 268 is coupled through the grating 266 and out of the waveguide propagating into free-space also at a normal angle.

When using diffraction gratings, the efficiency depends on the degree of matching between optical field and waveguide mode. The coupling matching equation is:

$$\beta_g = n_o k_o \sin\theta_i + \frac{m 2\pi}{\Lambda} \tag{15}$$

where m is the order of the diffraction mode, $\theta_i$ is the incident angle to respect to the normal, and $\Lambda$ is the grating period.

Note that the angle of diffraction may be controlled by altering the grating periods $\Lambda$ or the incident angle $\theta_i$. For coupling into a waveguide, $\beta_g$ should be matched to a mode of the waveguide.

In order to have 90-degree matching coupling from a normal incident beam(i.e $\theta_i$ =0). and from equations 15 and 14, the grating period may be defined as:

$$\Lambda = \frac{\lambda_o}{n_{eff}} \tag{16}$$

$$n_{eff} = \frac{\beta_{wg}}{k_o} \tag{17}$$

where $n_{eff}$ is defined as

Figure 21:
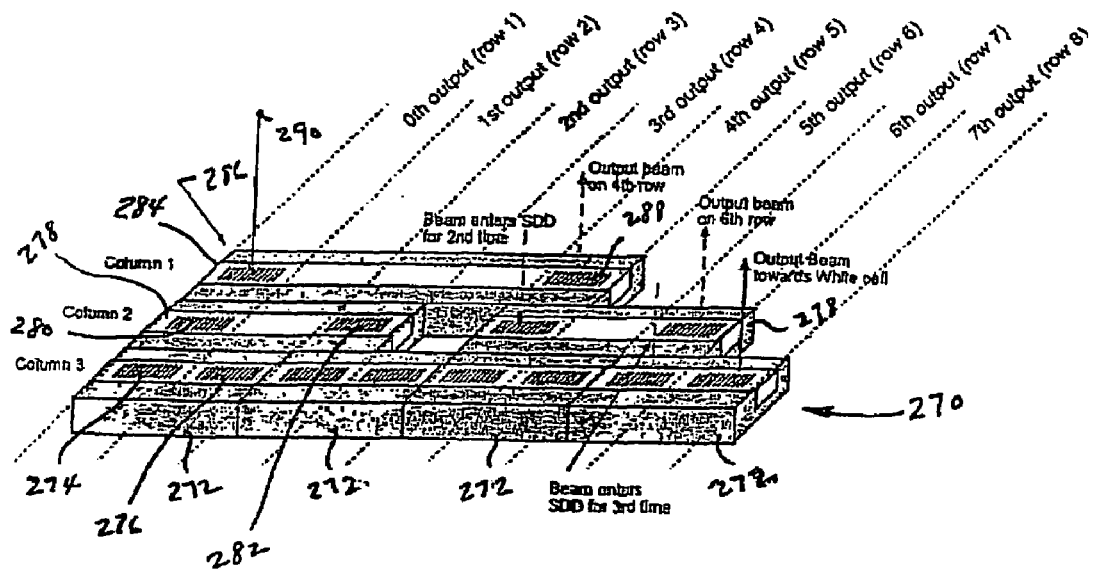
FIG. 21 is an isometric perspective illustration of a waveguide-based spot displacement device.

FIG. 21 is a isometric perspective illustration of an exemplary SDD 270 based on a waveguide with diffraction gratings as input and output light couplers. Referring to FIG. 21, each of the columns 1, 2 and 3 of the SDD 270 includes one or more waveguide sections similar to the section described above in connection with FIG. 20. For example, column 3 includes four waveguide sections 272 with each section 272 including an input grating coupler 274 and an output grating coupler 276. Accordingly, each section 272 of column 3 is configured to shift a light beam incident on its input grating coupler 274 a unit $\Delta$ before outputing the beam at the respective output grating coupler 276.

Likewise, column 2 may include two waveguide sections 278 with each section 278 including an input grating coupler 280 and an output grating coupler 282. Accordingly, each section 278 of column 2 is configured to shift a light beam incident on its input grating coupler 280 a unit 2$\Delta$ before outputing the beam at the respective output grating coupler 282. The 1st column of the SDD 270 may include a waveguide section 284 with an input grating coupler 286 and an output grating coupler 288. Waveguide section 284 may be configured to shift a light beam 290 incident its input grating coupler 286 a unit 4$\Delta$ before outputing the beam at the respective output grating coupler 288.

An example of operation of the waveguide-based SDD 270 that illustrates the switching steps to send a particular input beam to the seventh output in three bounces on the SDD 270. To accomplish this operational description, the SDD 270 is virtually divided into eight (8) rows corresponding to outputs 0 to 7, respectively, as shown in FIG. 21. The beam 290 may start in the lower left corner, at row 1 in column 1, enters the SDD 270 via grating 286 and be shifted so that it exits the same column via grating 288 in row 5 (see dashed line). From there, the beam is sent again to the White cell (see FIG. 4). In the White cell, the beam is switched by the MEMS array 52, for example, to return to the SDD (as opposed to the auxiliary mirror 22), but this time the beam is incident upon an input grating 280 of a waveguide section 278 of the second column and in the fifth row (see dashed line).

In the waveguide section 278, the beam is shifted two positions (2$\Delta$) to the seventh row where it exits through an output grating 282 of section 278 (see dashed line). The beam is directed again to the White cell (see FIG. 4), where it is again switched back to the SDD and directed to a waveguide section 272 in the seventh row of the third column (see dashed line). The beam is incident to an input grating 274 of the section 272 and enters the waveguide section wherein it is shifted one position ($\Delta$) to the eighth row and is output from the section 272 through an output grating 276 thereof (see solid arrowed line). Thus, by choosing the correct columns to which the beam is directed, any row may be progressively reached. The foregoing described series of steps may be summarize as follows: 4$\Delta$+2$\Delta$+$\Delta$=7$\Delta$; thus, the beam is directed to the seventh output in the present example.

A plurality of different embodiments for a spot displacement device (SDD) are used in an optical interconnection device by way of example. Two embodiments of the SDD are based on total internal reflection, one based on roof prisms in which an added array of micro lenses lowers the divergence of the input light beams and the other is based on a series of concatenated prisms also with a micro lens array at the input/output plane that decreases the beam divergence. Another SDD embodiment presented above is based on a lens train, in which the light divergence is controlled regardless the number of bounces. Yet another SDD embodiment is based on waveguides in which the light is coupled from free space to the waveguide. By coupling a free-space beam into a waveguide, the beam may propagate the necessary distance (shift) before coupling back the light into free-space.

For the waveguide-based SDD embodiment, the diffraction grating coupler offers an advantage over the prism coupler in that it can be made by regular semiconductor procedures, which facilitates the manufacture and reduces costs. An additional advantage that the grating coupler has over the prism coupler is of particular interest in our application in that it allows coupling to the waveguide coming from a normal incidence angle. Even though each SDD embodiment has specific characteristics, all of them share the same principle: each SDD column may produce a spot displacement twice the one produced by the previous SDD column (1$\Delta$ for the first column).

While the foregoing described SDD embodiments have been presented in connection with a binary White cell configuration optical interconnection device, it will be appreciated that they could be applied to other situations in which beams need to be displaced. In addition, the various embodiments described above were presented merely by way of example and not intended to limit the present invention in any way. Rather, the present invention should be construed in breadth and broad scope in accordance with the recitation of the claims appended hereto.

APPENDIX A

In this appendix, the astigmatism for the train lens SDD embodiment described herein above is analyzed for two different spot sizes and their maximum displacements. The objective is to compare the accumulated astigmatism to the depth of focus (DOF) of the system. In general, if the accumulated astigmatism is less than the DOF, then the astigmatism can be ignored and there is no need for correction. If, for a particular case, the accumulated astigmatism is larger that the-DOF, the astigmatism may have to be corrected at least to a value that is lower than the DOF.

Figure 22A:
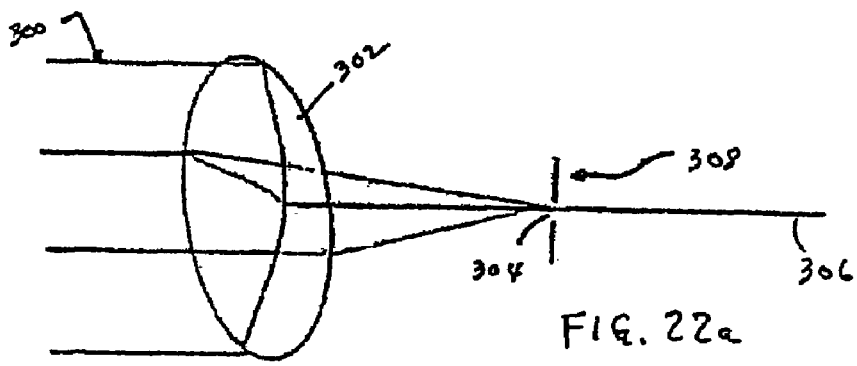
FIGS. 22a and 22b are isometric perspectives of a lens configuration illustrating principles of astigmatism.

Astigmatism is an optical aberration; it occurs when rays propagating in one plane are focused at one particular point and the rays traveling in a perpendicular plane focus at a different point along the optical axis. FIG. 22a shows light rays 300 refracting through an astigmatic lens 302 and converging to an astigmatic focus point 304 along a optical axis 306 of the lens 302. In FIG. 22a, rays in the horizontal plane will focus closer to the lens than the input rays in the vertical plane. In FIG. 22a, all of the rays 300 come to a horizontal focus forming a vertical line. This point is at a plane 308 perpendicular to the optical axis 306 and referred to as the tangential focal plane.

Figure 22B:
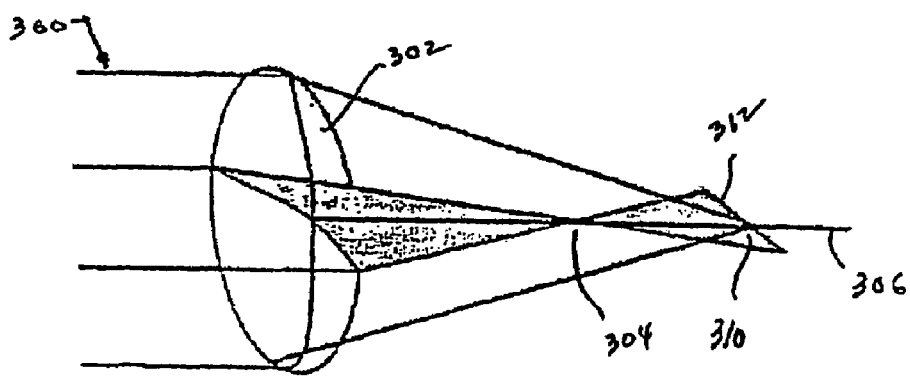

Further along the optical axis 306, the rays 300 will come to a vertical focus 310 and create a horizontal line 312 as show in the illustration of FIG. 22b. This second imaging plane 312 is called the saggital focal plane. The measure of astigmatism is the distance between the saggital and tangential focal planes. A consequence of astigmatism is that the light will form an elliptical shape at various points along the optical axis (except at the "circle of least confusion", in which it has a circular shape), and this non-circular shape will create coupling losses going into a fiber, for example. Also, astigmatism will accumulate at every bounce in the SDD, so it is important to determine the total astigmatism on the system.

First of all, let assume a Gaussian beam with waist radius wo and a wavelength λ. To calculate the spot size at a distance z we use:

$$\omega(z)^2 = \omega_0^2 \left(1 + \left(\frac{z}{z_0}\right)^2\right) \quad (A.1)$$

where w(z) is the spot size at z. From (A.1) we can calculate z as a function of w(z) as follows:

$$z = \left(\left(\frac{\omega(z)}{\omega_0}\right)^2 - 1\right)^{1/2} z_0 \quad (A.2)$$

where zo is the Rayleigh range and is calculated as $$z_0 \frac{\omega_0^2}{\lambda}$$

Astigmatism may be measured as the absolute value of the difference between the sagittal focal length and the tangential focal length.

$$\Delta T = \text{abs}(f_t - f_s) \quad (A.3)$$

where $f_t$ and $f_s$ are given by:

TABLE A.1

Calculated astigmatism for $\omega_0 = 5$ μm and $\omega_0 = 10$ μm

| Spot Size (μm) | θ | D (mm) | Astigmatism (mm) |
|---|---|---|---|
| 5 | 0.643 | 0.250 | 0.1405 |
| 10 | 0.307 | 0.540 | 0.0594 |

$$\int_t = \frac{R \cos \theta}{2} \quad (A.4)$$

$$\int_s = \frac{R}{2 \cos \theta} \quad (A.5)$$

and R is the radius of curvature of the spherical mirror. In Table A.1 we show the calculated astigmatism for a one-row-shift SDD for wo=5 μm and wo=10 μm.

We can see that the astigmatism is greatly reduced by just increasing the spot size. Table A.2 shows the accumulative astigmatism for a 8-position shift.

TABLE A.2

Accumulated astigmatism (measurements in mm)

| Displacement | $\omega_0 = 5$ μm | $\omega_0 = 10$ μm |
|---|---|---|
| 1 | 0.1405 | 0.0595 |
| 2 | 0.2811 | 0.1190 |
| 4 | 0.5622 | 0.2380 |
| 8 | 1.1244 | 0.4759 |
| Depth of focus | 0.1013 | 0.4188 |
| Accumulated Astigmatism | 2.1082 | 0.8924 |

It can be seen from table A.2 that the accumulated astigmatism is greater than the depth of focus for both cases, so it will be necessary to correct it. One way to correct the astigmatism is by substituting the spherical mirror with the use of cylindrical mirrors instead of spherical ones. Another conclusion from Table A.2 is that the accumulated astigmatism decreases by increasing the spot size.

What is claimed is:
1. An optical spot displacement apparatus comprising:
  a face, said face being divided into a plurality of columns;
  each column of said plurality including at least one entrance region, a respective exit region for each entrance region, and a predetermined number of prisms interconnecting corresponding entrance and exit regions, each entrance region and corresponding prisms and exit region of a same column configured within the corresponding column to displace at least one incident light beam a common predetermined distance from incidence and return a corresponding displaced light beam, and entrance regions and corresponding prisms and exit regions of different columns configured within each corresponding column to displace said at least one incident light beam a different predetermined distance from incidence;
  wherein the prisms of each column comprise roof prisms; wherein each roof prism comprises an entrance for accepting at least one light beam incident thereon and an exit for exiting said at least one incident light beam therefrom; and wherein each roof prism of the same column is configured within the corresponding column to displace the at least one incident light beam a common predetermined distance from prism entrance to prism exit, and each roof prism of different columns is configured within each corresponding column to displace the at least one incident light beam a different predetermined distance from prism entrance to prism exit.

2. The apparatus of claim 1, wherein each roof prism includes a base and at least two sides for internal reflection of light, the base of each said predetermined number of prisms of each column is disposed at said face for accepting at least one incident light beam at the entrance, for internally reflecting the at least one incident light beam, and for exiting the reflected at least one light beam the predetermined distance from the entrance.

3. The apparatus of claim 1, including at least one lens disposed at the entrance of each prism for reducing divergence of the at least one incident light beam; and at least one lens disposed at the exit of each prism for restoring any divergence of an exiting at least one light beam.

4. The apparatus of claim 1, wherein the predetermined number of prisms of different columns increase from column to column according to a binary sequence.

5. The apparatus of claim 1, wherein the prisms of some columns of the plurality comprise at least one pair of input and output prisms that are spaced apart along an optical path of the corresponding column a distance commensurate with the predetermined displacement distance of the at least one light beam, each input prism of said pair for directing the at least one incident light beam along said optical path to said output prism, and each output prism for receiving and exiting the at least light beam directed thereto.

6. The apparatus of claim 1, wherein the prisms of some columns of the plurality are joined together in sets so that the at least one incident light beam may travel inside each set of joined prisms; and wherein the number of prisms in each set for each of said some columns is commensurate with the predetermined displacement distance of the corresponding column of said set.

7. The apparatus of claim 6, wherein each prism of the some columns includes a base with an input light region and an output light region; and wherein the prisms are joined together at their bases output light region to input light region to form each set.

8. The apparatus of claim 6, including at least one lens disposed within each set of joined prisms for reducing beam divergence of the at least one light beam traveling the set.

9. An optical spot displacement apparatus comprising:
a device formed by a first plane and a second plane and virtually divided into a plurality of columns, each column of said plurality including;
at least a portion of a first mirror disposed at said first plane, said first mirror portion including at least one entrance region and a respective exit region for each entrance region;
a series of spherical mirrors disposed along a path at said second plane between each corresponding entrance and exit region;
wherein at least one light beam incident each entrance region will enter and travel along said corresponding path by reflections between the corresponding spherical mirrors of said second plane and the corresponding first mirror portion of said first plane until said at least one light beam reaches the corresponding exit region where it exits rendering the at least one light beam displaced by a predetermined distance commensurate with a distance between the corresponding entrance and exit regions of said first mirror portion.

10. The apparatus of claim 9, wherein the first and second planes are upper and lower planes, respectively, of an optical waveguide section.

11. The apparatus of claim 9, wherein each spherical mirror has a focal length; and wherein a distance between the first and second plane is less than substantially four times the focal length.

12. The apparatus of claim 9, including an input optical element disposed at a first entrance region for coupling the at least one incident light beam at a predetermined angle though the first plane to one of the spherical mirrors of the series.

13. The apparatus of claim 12, wherein the input optical element comprises a prism.

14. The apparatus of claim 9, including an output optical element disposed at a first exit region for coupling the at least one traveling light beam at a predetermined angle to exit though the first plane.

15. The apparatus of claim 14, wherein the output optical element comprises a prism.

16. An optical spot displacement apparatus comprising:
a face, said face being divided into a plurality of columns;
each column of said plurality including at least one entrance region, a respective exit region for each entrance region, and a predetermined number of waveguide based light beam displacement sections interconnecting corresponding entrance and exit regions, each entrance region and corresponding displacement sections and exit region of a same column configured within the corresponding column to displace at least one incident light beam a common predetermined distance from incidence and return a corresponding displaced light beam, and entrance regions and corresponding displacement sections and exit regions of different columns configured within each corresponding column to displace said at least one incident light beam a different predetermined distance from incidence.

17. The apparatus of claim 16, wherein each waveguide based light beam displacement section comprising:
a substrate of a first refractive index;
a core channel of a second refractive index disposed within said substrate, said second refractive index being greater than the first refractive index, said core channel including an entrance region and an exit region spaced apart a predetermined distance;
a first optical element disposed at said entrance region for coupling at least one incident light beam into said core channel at a first predetermined angle to cause said at least one incident light beam to travel through said core channel; and
a second optical element disposed at said exit region for coupling at least one traveling light beam from said core channel at a second predetermined angle to cause said at least one traveling light beam to exit from said core channel, wherein the light beam displacement distance of each section being commensurate with the predetermined distance separating the exit region from the entrance region.

18. The apparatus of claim 17, wherein the first optical element comprises a first diffraction grating disposed at the entrance region of the core channel for diffracting the at least one incident light beam at the first predetermined angle; and wherein the second optical element comprises a second diffraction grating disposed at the exit region of the core channel for diffracting the at least one traveling light beam at the second predetermined angle.

19. The apparatus of claim 18, wherein the first and second diffraction gratings are etched into their respective entrance and exit regions of the core channel.

20. An optical spot displacement apparatus, comprising:
a face virtually divided into a plurality of columns, each column of said plurality comprising:
  at least one entrance region;
  a respective exit region for each entrance region; and
  a displacement medium associated with each entrance region and interconnecting the corresponding entrance and exit regions;
wherein each entrance region and corresponding displacement medium and exit region are configured to displace an incident light beam a predetermined distance from incidence and return a corresponding displaced light beam.

21. An optical spot displacement apparatus, comprising:
a face virtually divided into a plurality of columns, each column of said plurality comprising:
  at least one entrance region;
  a respective exit region for each entrance region; and
  a displacement medium associated with each entrance region and interconnecting the corresponding entrance and exit region;
wherein each entrance region and corresponding displacement medium and exit region are configured to displace an incident light beam a predetermined distance from incidence and return a corresponding displaced light beam,
wherein each entrance region and corresponding displacement medium and exit region are configured to displace one or more incident light beams of a plurality of possible light beams the predetermined distance from incidence and return corresponding displaced light beams; and
wherein each of the plurality of possible light beams are distinguished by position in a spot image array having a plurality of columns and at least one row, each entrance region being virtually divided into an entrance array corresponding to the spot image array and each exit region being virtually divided into an exit array corresponding to the entrance array such that positions of displaced light beams in relation to the exit array are based at least in part on positions of corresponding incident light beams in relation to the entrance array.

22. An optical spot displacement apparatus, comprising:
a face virtually divided into a plurality of columns, each column of said plurality comprising:
  at least one entrance region;
  a respective exit region for each entrance region; and
  a displacement medium associated with each entrance region and interconnecting the corresponding entrance and exit regions;
wherein each entrance region and corresponding displacement medium and exit region are configured to displace an incident light beam a predetermined distance from incidence and return a corresponding displaced light beam,
wherein each entrance region and corresponding displacement medium and exit region are configured to displace one or more incident light beams of a plurality of possible light beams the predetermined distance from incidence and return corresponding displaced light beams; and
wherein each entrance region is virtually divided into an entrance array having a plurality of columns and at least one row and each exit region is virtually divided into an exit array corresponding to the entrance array such that positions of displaced light beams in relation to the exit array are based at least in part on positions of corresponding incident light beams in relation to the entrance array.

23. The apparatus of claim 22, further comprising:
a first entrance region and a first exit region associated with a first virtual column and configured to displace a first light beam a first predetermined distance;
a second entrance region and a second exit region associated with a second virtual column and configured to displace a second light beam a second predetermined distance, the second predetermined distance being twice that of the first predetermined distance.

24. The apparatus of claim 23, further comprising:
a third entrance region and a third exit region associated with a third virtual column and configured to displace a third light beam a third predetermined distance, the third predetermined distance being twice that of the second predetermined distance.

25. The apparatus of claim 23, further comprising:
a third entrance region and a third exit region associated with the second virtual column and configured to displace a third light beam the second predetermined distance.

26. The apparatus of claim 20, further comprising:
at least one roof prism associated with at least one virtual column to displace the corresponding incident light beam.

27. The apparatus of claim 20, further comprising:
at least three prisms associated with at least one virtual column to displace the corresponding incident light beam, said prisms joined together in sequence along an input/output plane.

28. The apparatus of claim 20, further comprising:
a lens train associated with one virtual column to displace the corresponding incident light beam.

29. The apparatus of claim 20, further comprising:
at least one wave guide section associated with at least one virtual column to displace the corresponding incident light beam.

30. An optical spot displacement apparatus comprising:
a face, said face being divided into a plurality of columns;
each column of said plurality including at least one entrance region, a respective exit region for each entrance region, and a predetermined number of prisms interconnecting corresponding entrance and exit regions, each entrance region and corresponding prisms and exit region of a same column configured within the corresponding column to displace at least one incident light beam a common predetermined distance from incidence and return a corresponding displaced light beam, and entrance regions and corresponding prisms and exit regions of different columns configured within each corresponding column to displace said at least one incident light beam a different predetermined distance from incidence;
wherein the prisms of some columns of the plurality are joined together in sets so that the at least one incident light beam may travel inside each set of joined prisms; and wherein the number of prisms in each set for each of said some columns is commensurate with the predetermined displacement distance of the corresponding column of said set.

31. The apparatus of claim 30, wherein each roof prism including a base and at least two sides for internal reflection of light, the base of each said predetermined number of prisms of each column disposed at said face for accepting at least one incident light beam at the entrance, for internally reflecting the at least one incident light beam, and for exiting the reflected at least one light beam the predetermined distance from the entrance.

32. The apparatus of claim 30, including at least one lens disposed at the entrance of each prism for reducing divergence of the at least one incident light beam; and at least one lens disposed at the exit of each prism for restoring any divergence of an exiting at least one light beam.

33. The apparatus of claim 30, wherein the predetermined number of prisms of different columns increase from column to column according to a binary sequence.

34. The apparatus of claim 30, wherein the prisms of some columns of the plurality comprise at least one pair of input and output prisms that are spaced apart along an optical path of the corresponding column a distance commensurate with the predetermined displacement distance of the at least one light beam, each input prism of said pair for directing the at least one incident light beam along said optical path to said output prism, and each output prism for receiving and exiting the at least light beam directed thereto.

35. The apparatus of claim 30, wherein each prism of the some columns includes a base with an input light region and an output light region; and wherein the prisms are joined together at their bases output light region to input light region to form each set.

36. The apparatus of claim 30, including at least one lens disposed within each set of joined prisms for reducing beam divergence of the at least one light beam traveling the set.

37. An optical spot displacement apparatus comprising:
a face, said face being divided into a plurality of columns;
each column of said plurality including at least one entrance region, a respective exit region for each entrance region, and a predetermined number of prisms interconnecting corresponding entrance and exit regions, each entrance region and corresponding prisms and exit region of a same column configured within the corresponding column to displace at least one incident light beam a common predetermined distance from incidence and return a corresponding displaced light beam, and entrance regions and corresponding prisms and exit regions of different columns configured within each corresponding column to displace said at least one incident light beam a different predetermined distance from incidence;
wherein the prisms of some columns of the plurality comprise at least one pair of input and output prisms that are spaced apart along an optical path of the corresponding column a distance commensurate with the predetermined displacement distance of the at least one light beam, each input prism of said pair for directing the at least one incident light beam along said optical path to said output prism, and each output prism for receiving and exiting the at least light beam directed thereto.

38. The apparatus of claim 37, wherein the prisms of each column comprise roof prisms; wherein each roof prism comprising an entrance for accepting at least one light beam incident thereon and an exit for exiting said at least one incident light beam therefrom; and wherein each roof prism of the same column configured within the corresponding column to displace the at least one incident light beam a common predetermined distance from prism entrance to prism exit, and each roof prism of different columns configured within each corresponding column to displace the at least one incident light beam a different predetermined distance from prism entrance to prism exit; and
wherein the prisms of some columns of the plurality are joined together in sets so that the at least one incident light beam may travel inside each set of joined prisms; and wherein the number of prisms in each set for each of said some columns is commensurate with the predetermined displacement distance of the corresponding column of said set.

39. The apparatus of claim 21, further comprising:
a first entrance region and a first exit region associated with a first virtual column and configured to displace a first light beam a first predetermined distance;
a second entrance region and a second exit region associated with a second virtual column and configured to displace a second light beam a second predetermined distance, the second predetermined distance being twice that of the first predetermined distance.

40. An optical spot displacement apparatus, comprising:
a face virtually divided into a plurality of columns, each column of said plurality comprising:
at least one entrance region;
a respective exit region for each entrance region; and
a displacement medium associated with each entrance region and interconnecting the corresponding entrance and exit regions;
a first entrance region and a first exit region associated with a first virtual column and configured to displace a first light beam a first predetermined distance;
a second entrance region and a second exit region associated with a second virtual column and configured to displace a second light beam a second predetermined distance, the second predetermined distance being twice that of the first predetermined distance;
wherein each entrance region and corresponding displacement medium and exit region are configured to displace an incident light beam a predetermined distance from incidence and return a corresponding displaced light beam; and
wherein each entrance region and corresponding displacement medium and exit region are configured to displace one or more incident light beams of a plurality of possible light beams the predetermined distance from incidence and return corresponding displaced light beams.

* * * * *

UNITED STATES PATENT AND TRADEMARK OFFICE
CERTIFICATE OF CORRECTION

PATENT NO. : 7,660,499 B2
APPLICATION NO. : 11/182111
DATED : February 9, 2010
INVENTOR(S) : Anderson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 478 days.

Signed and Sealed this

Thirtieth Day of November, 2010

David J. Kappos
*Director of the United States Patent and Trademark Office*